(12) United States Patent
Atluru et al.

(10) Patent No.: US 12,101,489 B2
(45) Date of Patent: Sep. 24, 2024

(54) SUPPORTING VIEW DIRECTION BASED RANDOM ACCESS OF BITSTREAM

(71) Applicant: Dolby Laboratories Licensing Corporation, San Francisco, CA (US)

(72) Inventors: Chaitanya Atluru, San Jose, CA (US); Ajit Ninan, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 51 days.

(21) Appl. No.: 18/006,026

(22) PCT Filed: Aug. 2, 2021

(86) PCT No.: PCT/US2021/044244
§ 371 (c)(1),
(2) Date: Jan. 19, 2023

(87) PCT Pub. No.: WO2022/031633
PCT Pub. Date: Feb. 10, 2022

(65) Prior Publication Data
US 2023/0300346 A1    Sep. 21, 2023

Related U.S. Application Data

(60) Provisional application No. 63/060,272, filed on Aug. 3, 2020.

(30) Foreign Application Priority Data

Aug. 3, 2020  (EP) .................................... 20189127

(51) Int. Cl.
*H04N 19/167*    (2014.01)
*H04N 19/129*    (2014.01)
(Continued)

(52) U.S. Cl.
CPC ......... *H04N 19/167* (2014.11); *H04N 19/129* (2014.11); *H04N 19/176* (2014.11);
(Continued)

(58) Field of Classification Search
CPC .. H04N 19/167; H04N 19/129; H04N 19/176; H04N 19/70; H04N 19/50; H04N 19/91
(Continued)

(56) References Cited

U.S. PATENT DOCUMENTS

| 5,559,722 A | 9/1996 | Nickerson |
| 6,950,930 B2 | 9/2005 | Wise |

(Continued)

FOREIGN PATENT DOCUMENTS

| WO | 2019068745 A1 | 4/2019 |
| WO | 2019120575 A1 | 6/2019 |

OTHER PUBLICATIONS 20189127.2, "Extended European Search Report," mailed Jan. 22, 2021.

(Continued)

*Primary Examiner* — Dominic D Saltarelli

(57) ABSTRACT

A non-random-access video stream is received. A first image block is encoded after second image blocks according to a non-random-access processing order. View direction data is received to indicate a viewer's view direction coinciding with a location covered by the first image block. The first image block is encoded into the random-access video stream before the second image blocks in a random-access processing order. The random-access video stream is delivered to a recipient decoding device operated by the viewer to cause the first image block to be processed and rendered before the second image blocks according to the random-access processing order.

20 Claims, 7 Drawing Sheets

(51) Int. Cl.
  *H04N 19/176* (2014.01)
  *H04N 19/50* (2014.01)
  *H04N 19/70* (2014.01)
  *H04N 19/91* (2014.01)

(52) U.S. Cl.
  CPC ............. *H04N 19/70* (2014.11); *H04N 19/50* (2014.11); *H04N 19/91* (2014.11)

(58) Field of Classification Search
  USPC .................................................... 375/240.02
  See application file for complete search history.

(56) References Cited

U.S. PATENT DOCUMENTS

| | | |
|---|---|---|
| 8,749,409 B2 | 6/2014 | Xu |
| 8,898,337 B2 | 11/2014 | Demidov |
| 9,001,882 B2 | 4/2015 | Sachdeva |
| 9,516,379 B2 | 12/2016 | Chen |
| 9,807,406 B2 | 10/2017 | Ramasubramonian |
| 9,866,852 B2 | 1/2018 | Ramasubramonian |
| 9,990,988 B2 | 6/2018 | Parthasarathy |
| 10,063,861 B2 | 8/2018 | Chen |
| 10,148,983 B2 | 12/2018 | Hendry |
| 10,432,964 B2 | 10/2019 | Sullivan |
| 2018/0097867 A1* | 4/2018 | Pang .................... H04N 5/2226 |
| 2018/0164593 A1 | 6/2018 | Van Der Auwera |
| 2019/0379876 A1 | 12/2019 | Hur |

OTHER PUBLICATIONS

PCT/US2021/044244, EPO as ISA, "International Preliminary Report on Patentability," mailed Feb. 16, 2023.

PCT/US2021/044244, EPO as ISA, "International Search Report and Written Opinion," mailed Nov. 10, 2021.

Duanmu Fanyi et al., "View Direction and Bandwidth Adaptive 360 Degree Video Streaming Using a Two-Tier System," 2017 IEEE International Symposium on Circuits and Systems (ISCAS), IEEE, May 28, 2017 (May 28, 2017), pp. 1-4, XP033156178, DOI: 10.1109/ISCAS.2017.8050575.

Sanchez Y et al., "Compressed Domain Video Processing for Tile Based Panoramic Streaming Using HEVC," 2015 IEEE International Conference on Image Processing (ICIP), IEEE, Sep. 27, 2015 (Sep. 27, 2015), pp. 2244-2248, XP032826822, DOI: 10.1109/ICIP.2015.7351200.

* cited by examiner

SUPPORTING VIEW DIRECTION BASED RANDOM ACCESS OF BITSTREAM

CROSS-REFERENCE TO RELATED APPLICATIONS

This application is a U.S. National Stage application under U.S.C. 371 of International Application No. PCT/US2021/044244, filed on 2 Aug. 2021, which claims priority to United States Provisional Patent Application No. 63/060,272 filed 3 Aug. 2020, and European Patent Application No. 20189127.2, filed 3 Aug. 2020, each of which are incorporated herein by reference.

BACKGROUND

Technology

Embodiments of the present disclosure relate generally to image coding and rendering, and in particular, to video codec.

Background

Video coding standards such as Moving Picture Experts Group 1 (MPEG-1) Video, MPEG-2 Video, MPEG-4 Visual, H.264/Advanced Video Coding (H.264/AVC), High-Efficiency Video Coding (HEVC), or the like, have been developed over time to compress and stream relatively high quality video at a relatively low bit rate.

However, in an augmented reality (AR), virtual reality (VR) or immersive video application, a viewer can view a depicted scene from different view positions and different view orientations at different time points. The amount of desired video data to support a seamless high quality AR, VR or immersive video experience at all time is enormous, difficult and even currently impractical to support.

Significant time lags may occur when high quality image content is being streamed, processed, and rendered to the viewer, coinciding with the viewer's changes in positions and orientations. The time lags may be readily perceivable by the viewer. Video streaming and/or coding techniques that support high quality video experiences with little or no artifacts are needed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

Embodiments of the present disclosure are illustrated by way of example, and not by way of limitation, in the figures of the accompanying drawings and in which like reference numerals refer to similar elements and in which.

DESCRIPTION OF EXAMPLE EMBODIMENTS

Figure 1A:
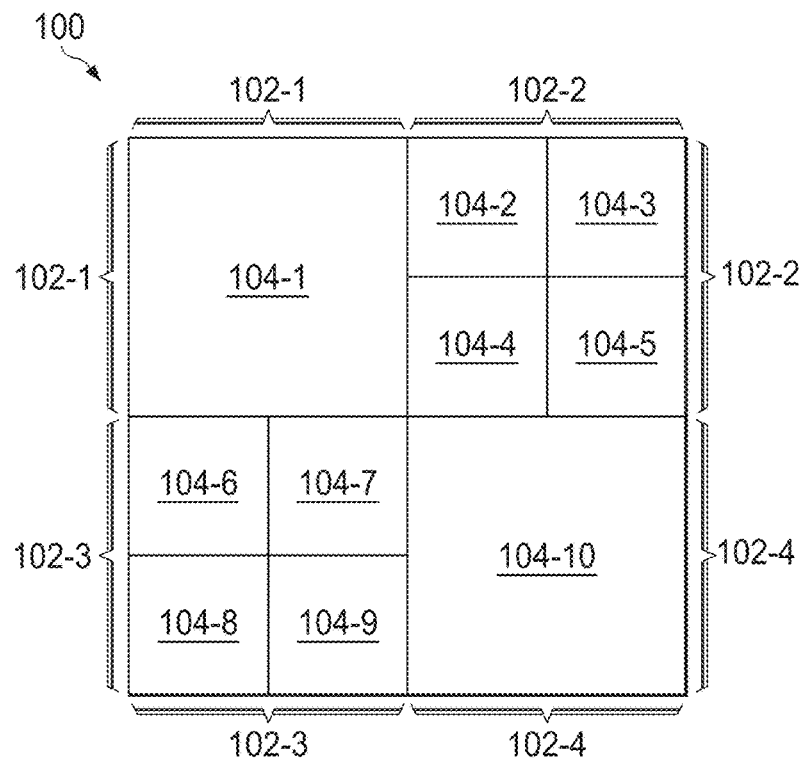
FIG. 1A illustrates an example image.

Example embodiments, which relate to codec saved state for random access of bitstream, are described herein. In the following description, for the purposes of explanation, numerous specific details are set forth in order to provide a thorough understanding of embodiments of the present disclosure. It will be apparent, however, that embodiments of the present disclosure may be practiced without these specific details. In other instances, well-known structures and devices are not described in exhaustive detail, in order to avoid unnecessarily occluding, obscuring, or obfuscating embodiments of the present disclosure.

Example embodiments are described herein according to the following outline:

1. GENERAL OVERVIEW
2. IMAGE DATA PROCESSING ORDERS
3. VIEW DIRECTION INDEPENDENT PROCESSING ORDERS
4. VIEW DIRECTION DEPENDENT PROCESSING ORDERS
5. EXAMPLE PROCESS FLOWS
6. IMPLEMENTATION MECHANISMS—HARDWARE OVERVIEW
7. EQUIVALENTS, EXTENSIONS, ALTERNATIVES AND MISCELLANEOUS

1. General Overview

This overview presents a basic description of some aspects of an example embodiment of the present disclosure. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor embodiments of the disclosure in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Under other approaches that do not implement techniques as described herein, an encoder, a decoder, a video data packer (e.g., a device or system packing video data for streaming or transmission, etc.), a streamer (e.g., a device or system streaming or transmitting coded video(s), etc.), etc., of a specifically coded video (e.g., video coded by a specific standard such as HEVC, etc.) would follow the same specifically laid out path. A codec typically could not deviate the specifically laid out path and jump to any specific block (e.g., sub-macroblock, macroblock, coding unit, slice, etc.) not along the specifically laid out path.

In contrast, techniques as described herein may be used to provide or implement direct random access to an area of a compressed image (e.g., sub-macroblock, macroblock, coding unit, slice, etc.) for efficient AR/VR/immersive video coding. The area can be within an identified region of interest, which can be based on active user feedback (e.g., eye tracking, etc.) or creative intent. A compressed bitstream as described herein can be dynamically packed, when transmitted for rendering to a viewer, to include additional information such as state variables, neighboring block metrics, and the like information to be used for decoding a random accessed block. This additional information can be sent as image metadata including but not necessarily limited to only an SEI (supplement enhancement information) message or ancillary information, PPS (picture parameter set), SPS (sequence parameter set), slice header, and so forth. Additionally, optionally or alternatively, the additional information can be packed with SEI messaging or ancillary information, PPS (picture parameter set), SPS (sequence parameter set), slice header, and so forth, associated with a region of interest.

Example embodiments described herein relate to providing video stream data. A non-random-access video stream encoded with image blocks to be processed with a non-random-access processing order is accessed. A first image block of the image blocks is to be processed after one or more second image blocks in accordance with the non-random-access processing order. View direction data of a viewer collected in real time is received while the viewer is viewing video content of a random-access video stream. The random-access video stream is generated from the non-random-access video stream. The view direction data indicates the viewer's view direction coinciding with a location covered by the first image block while the viewer is viewing the video content of the random-access video stream. The first image block is encoded into the random-access video stream before the one or more second image blocks in a random-access processing order different from the non-random-access processing order. The random-access processing order is dependent of the viewer's view direction while video content of the random-access video stream is being rendered to the viewer. The non-random-access processing order is independent of the viewer's view direction. The random-access video stream is delivered to a recipient decoding device operated by the viewer to cause the first image block to be processed and rendered from the random-access video stream before the one or more second image blocks in accordance with the random-access processing order.

Example embodiments described herein relate to rendering video stream data. A random-access video stream is received from an upstream device. The random-access video stream is generated from a non-random-access video stream. View direction data of a viewer collected in real time while the viewer is viewing video content of the random-access video stream is sent to the upstream device. The view direction data indicates the viewer's view direction coinciding with a location covered by a first image block of image blocks while the viewer is viewing the video content of the random-access video stream. The non-random-access video stream is encoded with image blocks to be processed with a non-random-access processing order. The first image block of the image blocks is to be processed after one or more second image blocks in accordance with the non-random-access processing order. The random-access processing order is dependent of the viewer's view direction while the video content of the random-access video stream is being rendered to the viewer. The non-random-access processing order is independent of the viewer's view direction. The first image block is received, from the upstream device, before the one or more second image blocks by way of the random-access video stream. The first image block is processed and rendered before the one or more second image blocks in accordance with the random-access processing order.

In some example embodiments, mechanisms as described herein form a part of a media processing system, including but not limited to any of: cloud-based server, mobile device, virtual reality system, augmented reality system, head up display device, helmet mounted display device, CAVE-type system, wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Image Data Processing Orders

An image to be encoded into a video stream may be split or partitioned into one big slice or smaller slices based on streaming parameters, storage parameters, or other proprietary or standard parameters.

FIG. 1A illustrates an example image/frame 100 to be encoded in a (e.g., non-random-access, etc.) video stream. As shown, the image (100) may be split or partitioned by a (e.g., non-random-access, etc.) video encoder into a hierarchy of image blocks. For example, at the top level of the hierarchy, the image (100) may be split or partitioned into one or more top level image blocks 102-1 through 102-4 each of which represents a slice.

Each slice or top level image block (e.g., 102-2, etc.) may be further split or partitioned by into one or more next level—below the top level—image blocks (e.g., 104-2 through 104-5, etc.). For example, the slices (102-2) and (102-3) may be respectively split or partitioned into multiple next level image blocks 104-2 through 104-5 and 104-6 through 104-9. In comparison, each of the slices (102-1) and (102-4) may comprise a single next level image block 104-1 or 104-10.

In various operational scenarios, each next level image block as described herein may represent a coding unit, a prediction unit, a macroblock, a sub-macroblock, etc. Additionally, optionally or alternatively, in some operational scenarios, the next level image block may be further split or partitioned into one or more smaller units such as prediction units, sub-macroblocks, etc.

Sizes of image blocks as described herein may or may not vary in a hierarchy of image blocks of an image. Example image block sizes in the hierarchy may include, but are not necessarily limited to only, any of: 8×8, 16×16, 32×32, 64×64, 128×128, or a smaller or larger size in units of pixels.

An image (e.g., 100 of FIG. 1A, etc.) in a video stream may be encoded ahead of (e.g., media streaming, media consumption, image rendering, image viewing, etc.) time. For example, splitting or partitioning of the image into an hierarchy of image blocks and a specific processing order or path used to identify/encode/decode the image blocks of the hierarchy can be determined ahead of (e.g., media streaming, media consumption, image rendering, image viewing, etc.), independent or regardless of a viewer's view direction, viewport or region of interest (ROI) later determined in real time or near real time of an AR, VR or immersive video experience. A processing order or path determined ahead of time may be referred to as a canonical or non-random-access processing order or path. Example non-random-access processing orders may include, but are not limited to, a raster order, a zig-zag order, a pre-determined order, a pre-designated order, a standard based order, and so forth.

Figure 1B:
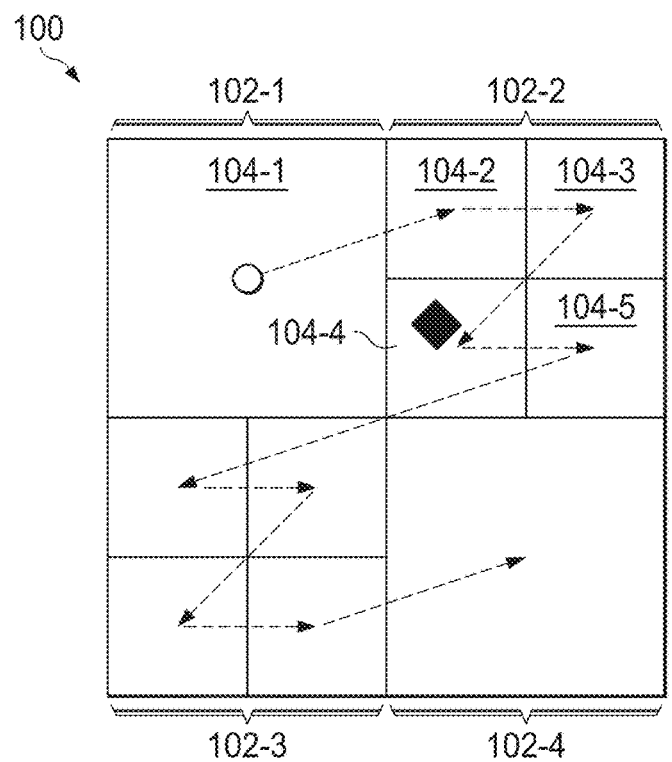
FIG. 1B illustrates an example non-random-access image data processing order.

FIG. 1B illustrates an example non-random-access processing order for processing and encoding image blocks of an image (e.g., 100 of FIG. 1A, etc.). As noted, the non-random-access processing order is determined ahead of time, independent or regardless of a viewer's view direction, viewport or ROI later determined in real time or near real time of an AR, VR or immersive video experience.

By way of illustration but not limitation, the non-random-access processing order of FIG. 1B may be a raster order. That is, image blocks of the same level in a hierarchy of image blocks of an image or in the same larger image block are processed from left to right and then from top to bottom.

For example, in the hierarchy of image blocks of the image (100), the top-level image blocks representing the image slices (102-1) through (102-4) of the image (100) are processed and encoded from left to right and from top to bottom, namely first 102-1 (which is denoted by a solid circle as the starting point of the processing order represented by a sequence of successive broken arrows) then 102-2, followed by 102-3 and 102-4. In the same larger image block (e.g., the slice 102-2, etc.), the smaller image blocks (e.g., macroblocks 104-2 through 104-5, etc.) within the larger image block (the slice (102-2) in the present example) are processed and encoded from left to right and from top to bottom, namely first 104-2 then 104-3, followed by 104-4 and 104-5.

As illustrated in FIG. 1B, a viewer's view direction for a time point at which some or all portions of the image (100) is rendered to the viewer may point to a location as represented by a black diamond in the image block (corresponding to 104-4 of FIG. 1A) of the image (100). However, independent or regardless of this location corresponding to the viewer's view direction, the pre-determined non-random-access processing order of FIG. 1B would still process and encode the image blocks (corresponding to 104-1, 104-2 and 104-3 of FIG. 1A) before the image block (corresponding to 104-4 of FIG. 1A).

This approach may work fine when video coding or streaming is not based on active feedback associated with a viewer of images rendered from the video stream. However, to better support AR, VR or immersive video experiences, techniques as described herein can be used to access or process image blocks of a frame/image, even in an already encoded video stream, in a random-access processing order that is dependent on or decided by a viewer's view direction, viewport or ROI contemporaneously determined in real time or near real time of an AR, VR or immersive video experience. As a result, image blocks corresponding to the viewer's view direction, viewport or ROI can be rendered or refreshed with no or little viewer perceptible time lags or visual artifacts.

As used herein, random access may refer to access, process, stream, decode and/or render specific image block(s) or specific point(s) in a hierarchy of image blocks in an image, where the specific image block(s) or specific point(s) are identified or determined in the images based on (or corresponding to) a viewer's view direction, viewport or ROI contemporaneously determined in real time or near real time, or similar attributes that are contemporaneously determined based at least in part on real time or near real time sensory data collected from or associated with the viewer. These image blocks or points in the hierarchy are deemed random with respect to a pre-determined non-random-access processing order of the image used by an encoder to encode the image regardless or independent of the viewer's view direction, viewport or ROI contemporaneously determined in real time or near real time, or similar attributes.

In an AR, VR or immersive video application, a viewer may change view direction, viewport and ROI from time to time while images of the AR, VR or immersive video application are being rendered on the viewer's display. A view direction determined for a given time may refer to a viewer's orientation, and may be used interchangeably with one or more of: a viewport or the entire viewing region of the viewer's display, a foveal vision area in the viewer's vision field, a foveal vision area plus near peripheral vision adjacent to the foveal vision area in the viewer's vision field, a region of interest of the viewer as determined based on real time or near real time sensory data collected from the viewer, and so forth, as determined for the given time.

In some operational scenarios, through the use of one or more eye tracking devices or modules, the viewer's view direction may be monitored and determined in real time or near real time (e.g., with a latency of 1 or 5 milliseconds or 20 milliseconds, with a strict latency below a perceptible time lag threshold or budget, etc.).

Instead of and/or in addition to streaming image blocks independent or regardless of a viewer's view direction contemporaneously determined in real time or in near real time, a subset of image blocks or slices corresponding to the viewer's view direction may be selected from all image blocks or slices of an image in an input video stream and first streamed out of order ahead of other image blocks or slices in an output video stream. The subset of image blocks or slices can be dynamically accessed and packaged in the output video stream that is altered from the input video stream. As a result, the subset of image blocks or slices can be timely delivered, decoded and/or rendered to the viewer by way of the output video stream that has been altered from the input video stream.

Figure 1C:
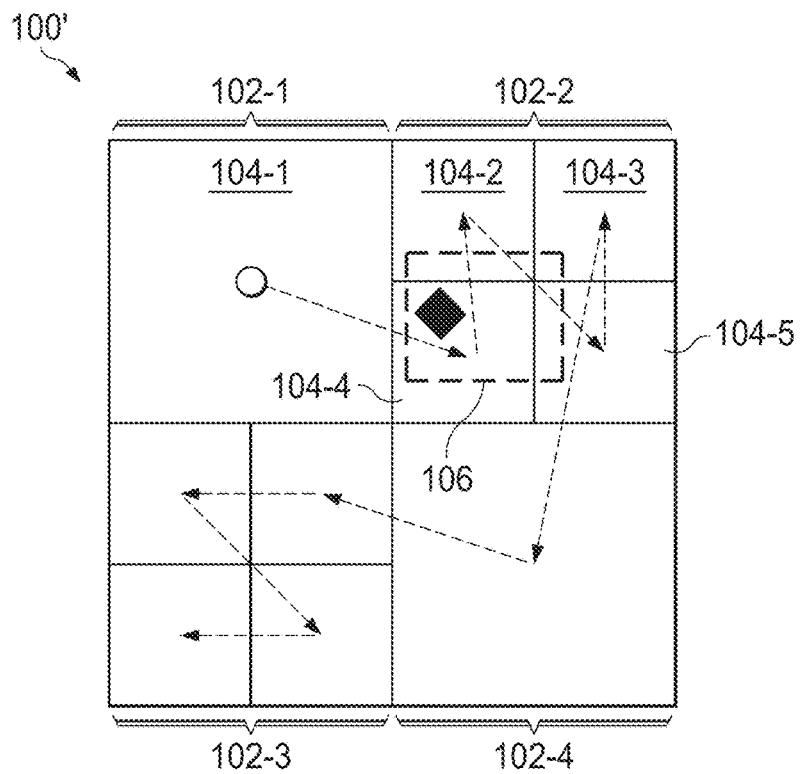
FIG. 1C illustrates an example random-access image data processing order.

FIG. 1C illustrates an example random access processing order for processing and encoding image blocks of an image (e.g., 100 of FIG. 1A, etc.). The random access processing order is different from the pre-determined non-random-access processing order of FIG. 1B. The random access processing order is not pre-determined ahead of time, but rather is determined based on the viewer's view direction, viewport or ROI contemporaneously determined in real time or near real time of an AR, VR or immersive video experience. The random access processing order is dependent on or is decided at least in part by the viewer's view direction, viewport or ROI contemporaneously determined in real time or near real time.

By way of illustration but not limitation, the random access processing order of FIG. 1C may first access or jump to a subset of one or more image blocks or slices that cover the viewer's view direction, viewport or ROI contemporaneously determined in real time or near real time, even when there may exist other image blocks that have precedence in a canonical processing order such as a raster order. Thus, the subset of image blocks or slices may be (e.g., immediately, as soon as the current image block is finished, etc.) prioritized in the random access processing order, even if the canonical or non-random-access processing order such as a raster order is violated.

As illustrated in FIG. 1C, initially, an image block 104-1 of an image 100' is first accessed, processed, packaged, decoded, and/or rendered. The image (100') of FIG. 1C may be equivalent to the image (100) of FIG. 1A or FIG. 1B except for the difference in the processing orders. Image blocks of the image (100') may be the same as, or corresponding to, the image blocks (104-1 through 104-10) of the image (100) of FIG. 1A.

While the image block (104-1) is being accessed, processed, packaged, decoded, and/or rendered for a first time point, the viewer's view direction for a second time point immediately subsequent to the first time point may be contemporaneously determined as pointing to a location as represented by a black diamond in an image block 104-4 of the image (100').

In response to determining the viewer's view direction for the second time point, a variety of random access processing orders may be used to provide random access to a subset of image blocks (e.g., 104-4, 104-2 and 104-5, etc.), including but not necessarily limited to the image block (104-4), that correspond to the viewer's view direction, viewport or ROI contemporaneously determined in real time or in near real time.

In a first example random access processing order, the image block (104-4) of the image (100) is next accessed, processed, packaged, decoded and/or rendered for the second time point, followed by other image blocks (e.g., 104-1, 104-2, 104-3, etc.) of the image (100) for other time points subsequent to the second time point. In some operational scenarios, some or all of the image blocks away from the viewer's view direction, viewport or ROI contemporaneously determined in real time or in near real time may still be processed in a set order such as a raster order, a zigzag order, etc.

In a second example random access processing order, starting from the image block (104-4), image blocks of image (100) may be next accessed for the second time point as well as other time points subsequent to the second time point in a spiral order, such as Archimedean spiral order, clockwise or counter-clockwise.

In a third example random access processing order, starting from the image block (104-4), image blocks of image (100) may be next accessed for the second time point as well as other time points subsequent to the second time point in an order based at least in part on their respective distances (e.g., Euclidean distances, etc.) to the image block (104-4).

As illustrated in FIG. 1C, image blocks of the image (100') are not processed in a raster order from left to right and from top to bottom. Instead, at the second time point after the image block (104-1), the image block (104-4) corresponding to the viewer's real time or near real time view direction, viewport or ROI is selected to be the next image block in the random-access processing order as represented by a sequence of successive broken arrows. In this random access processing order, the image block (104-4) is next accessed, processed, packaged, decoded and/or rendered, followed by the image blocks (104-2, 104-5 and 104-3). As shown in FIG. 1C, the image blocks (104-4, 104-2, 104-5 and 104-3) collectively cover the viewer's real time or near real time viewport or region of interest (e.g., 106 of FIG. 1C, etc.) and are thus prioritized in real time or in near real time in the random access processing order.

In some operational scenarios, following the image blocks that cover the viewer's real time or near real time viewport or region of interest (106), some or all other image blocks in the image (100) may be accessed, processed, packaged, decoded and/or rendered. In some operational scenarios, one or more of these other image blocks may be skipped, using previous images (e.g., immediately preceding or succeeding images in the same scene as the image (100), etc.), or using concurrent (e.g., relatively low quality, etc.) images from a different video stream or a different video sub-stream.

3. View Direction Independent Processing Orders

Figure 2A:
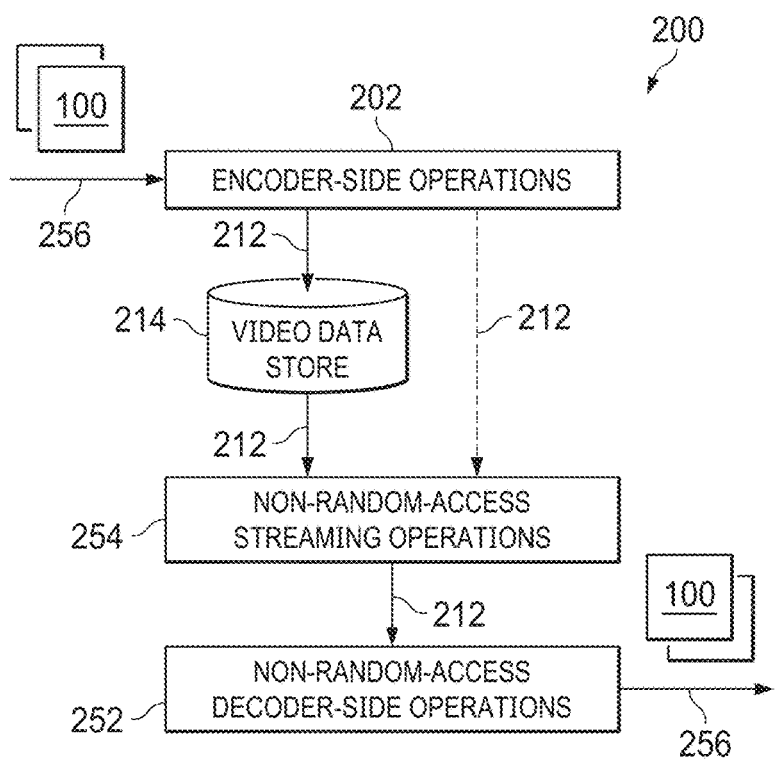
FIG. 2A through FIG. 2C illustrate example video delivery pipeline and example codecs for non-random-access image data processing.

FIG. 2A illustrates an example video delivery pipeline 200, in which a source video stream is received by the pipeline (200) as input from an external video data source, and a target video stream is outputted by the pipeline (200) as output for rendering to a viewer.

The source video stream is encoded with a sequence of (e.g., relatively high quality, uncompressed, less compressed, etc.) source video images 256 including but not limited to the image (100) of FIG. 1A or FIG. 1B.

The video delivery pipeline (200) includes a video encoder that performs (non-random-access) encoder-side operations 202. The encoder-side operations (202) split or partition each source video image in the sequence of source video images 256 into respective source image blocks of each such source video image. The encoder-side operations (202) access, process and/or encode, in a non-random-access image block processing order, the respective image blocks to generate compressed non-random-access image blocks corresponding to the respective source image blocks. The compressed non-random-access image blocks are encoded into a non-random-access video stream 212.

The non-random-access video stream (212) is delivered to a recipient non-random-access streaming server directly or indirectly over one or more first data links (or first computer network paths) with relatively high bandwidth, relatively low latency, etc.

In a first example, the non-random-access video stream (212) may be first outputted by the encoder-side operations (202) of the video encoder and stored on a tangible computer-readable storage medium such as a video data store 214, and then retrieved by a non-random-access streaming server (or a non-random-access recoding server) from the tangible computer-readable storage medium.

In a second example, the non-random-access video stream (212) may be outputted by the encoder-side operations (202) of the video encoder to the non-random-access streaming server (or non-random-access recoding server) directly.

The non-random-access streaming server of the video delivery pipeline (200) performs non-random-access streaming operations 258 on the non-random-access video stream (212) in compliance with the non-random-access image block processing blocks to stream the non-random-access video stream (212) to a recipient non-random-access video decoder over one or more second data links (or second computer network paths). The second data links may be with relatively low bandwidth, relatively high latency, etc., as compared with the first data links (or the first computer network paths).

The non-random-access video decoder of the video delivery pipeline (200) performs non-random-access decoding operations 252 on the non-random-access video stream (212) in compliance with the non-random-access image block processing order to uncompress compressed image blocks encoded in the non-random-access video stream (212). The uncompressed image blocks are then used to generate a reconstructed version of the sequence of source video images 256. The reconstructed version of the sequence of source video images, including but not limited to a reconstructed version of the image (100) of FIG. 1A or FIG. 1B, is outputted by the video deliver pipeline (200) or the non-random-access video decoder to an image rendering device or a target image display for rendering to a viewer.

Figure 2B:
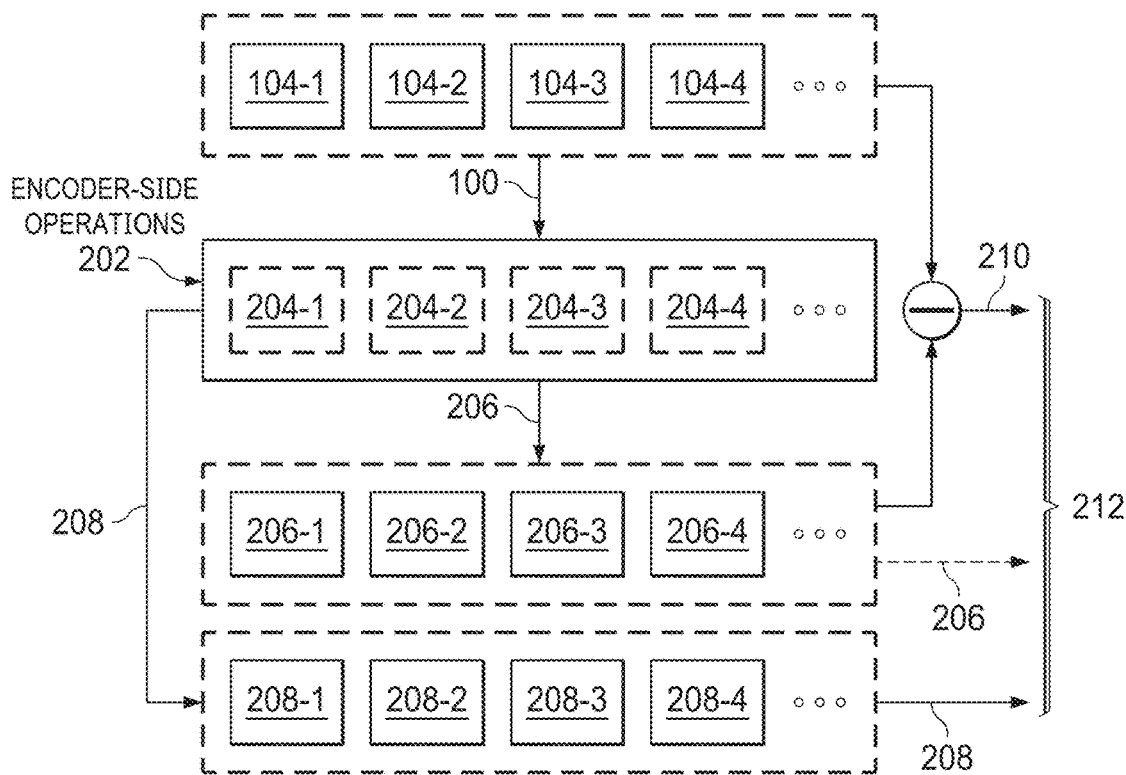

FIG. 2B illustrates example (non-random-access) encoder-side operations 202 of an encoding process performed by a video encoder. These encoder-side operations (202) may include, but are not necessarily limited to only: prediction operations, filtering operations, quantization operations, dequantization operations, transformation operations, inverse transformation operations, addition operations, subtraction operations, multiplying operations, division operations, entropy coding operations, variable length coding (VLC) operations, context adaptive variable length coding or CAVLC operations, context adaptive binary arithmetic coding or CABAC operations, and so forth.

The video encoder splits or partitions each source image (e.g., 100 of FIG. 1A or FIG. 1B, etc.) into a non-random-access sequence of image blocks 104, which comprises individual image blocks 104-1, 104-2, 104-3, 104-4, ..., etc., in a specific non-random-access image block processing (or encoding) order (e.g., raster, zigzag, etc.). The video encoder accesses and processes the non-random-access sequence of image blocks (104) to generate or construct a non-random-access sequence of predicted image blocks 206.

The non-random-access sequence of predicted image blocks (206) comprises individual predicted image blocks 206-1, 206-2, 206-3, 206-4, ..., etc., to be applied in predictive coding operations in accordance with the specific non-random-access image block processing (or encoding) order (e.g., raster, zigzag, etc.).

Prediction operations in the encoder-side operations (202) can apply predictive coding techniques such as inter predictions (e.g., including but not limited to skip mode, etc.), intra prediction (e.g., including but not limited to DC mode, etc.), etc., to reduce data redundancy that may exist in the individual image blocks (104-1, 104-2, 104-3, 104-4, etc.) of the image (100) for the purpose of generating the non-random-access sequence of predicted image blocks (206). Inter prediction (e.g., motion estimation, motion compensation, etc.) can be used or applied to determine how pixels in a to-be-encoded image block can be generated based at least in part on (prior decoded/reconstructed) reference image blocks in reference images or slices. Intra prediction can be used or applied to determine how pixels in a to-be-encoded image block of an image or slice can be generated based at least in part on neighboring pixels of (prior decoded/reconstructed image blocks in) the same image or slice.

As illustrated in FIG. 2B, the non-random-access sequence of image blocks (104) and the non-random-access sequence of predicted image blocks (206) are provided as input to subtraction operations (or division operations) to generate a non-random-access sequence of residual image blocks 210. The non-random-access sequence of residual image blocks (210) comprises individual residual image blocks each of which includes residual image data generated based on differences (or ratios) between a respective image block (e.g., 104-2, etc.) in the non-random-access sequence of image blocks (104) and a respective predicted image block (e.g., 206-2, etc.) in the non-random-access sequence of predicted image blocks (206).

Differences (or ratios) constituting residual image data of each residual image block in the non-random-access sequence of residual image blocks (210) may be generated by applying the subtraction operations (or the division operations) to a respective image block (e.g., 104-2, etc.) in the non-random-access sequence of image blocks (104) and a respective predicted image block (e.g., 206-2, etc.) in the non-random-access sequence of predicted image blocks (206). Example residual image data generated based on differences (or ratios) between (input) image blocks and predicted image blocks as described herein may include, but is not necessarily limited to only, pixel values represented in a spatial (or pixel) domain or transform (e.g., DCT, DST, etc.) coefficients represented in a transform or frequency domain.

Residual image data in each residual image block of the non-random-access sequence of residual image blocks (210) may be linearly or nonlinearly quantized and encoded (e.g., through entropy coding that scans quantized coefficient from a two-dimensional block to serialized one-dimensional vectors, etc.) into a non-random-access video stream 212.

To support image reconstruction that will be performed by a recipient device (e.g., a decoding device, a transcoding device, a packaging device, a streaming server device, a media distribution system, etc.) of the non-random-access video stream (212), the encoder-side operations (202) generate or construct a non-random-access sequence of image metadata 208. The non-random-access sequence of image metadata (208) comprises individual image metadata portions 208-1, 208-2, 208-3, 208-4, ..., etc., to be applied in (non-random-access) decoder-side image reconstruction operations to generate a reconstructed version of the image (100) for rendering to a viewer.

VLC operations in the encoder-side operations (202) can access or look up in one or more VLC codebooks (or VLC tables) and apply VLC coding information in the VLC codebooks to convert some or all image data and/or image metadata associated with image blocks as described herein into VLC codewords with relatively high bit rate efficiency. For example, each of the individual image metadata portions (208-1, 208-2, 208-3, 208-4, ..., etc.) in the non-random-access sequence of image metadata (208) may be coded with the VLC operations into a bitrate efficient VLC representation of the image metadata included in the non-random-access sequence of image metadata (208).

The non-random-access sequence of image metadata (208) in the bitrate efficient VLC representation may be included as a part of overall image metadata to be carried with or in the non-random-access video stream (212) (e.g., in the same video stream, in an auxiliary sub video stream, etc.).

Figure 2C:
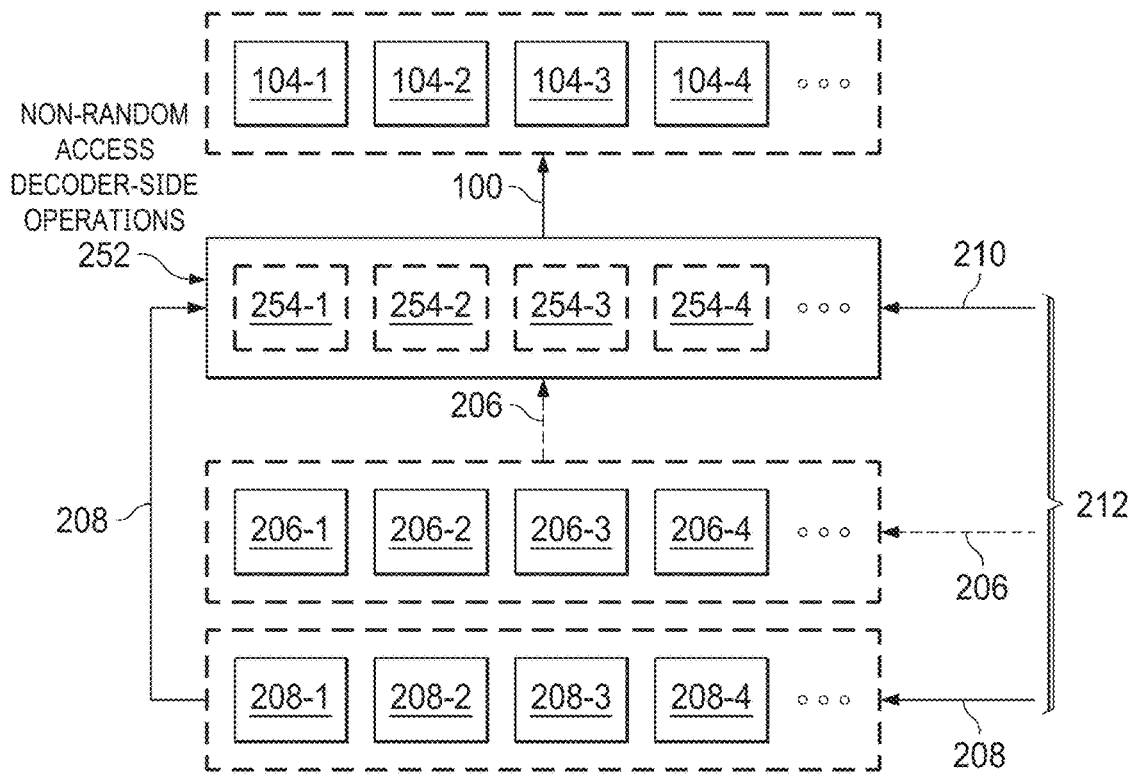

FIG. 2C illustrates example (non-random-access) decoder-side operations 252 of a decoding process performed by a recipient device (or a decoder device) of the non-random-access video stream (212). These decoder-side operations (252) may include, but are not necessarily limited to only: prediction operations, filtering operations, quantization operations, dequantization operations, transformation operations, inverse transformation operations, addition operations, subtraction operations, multiplying operations, division operations, entropy coding operations, variable length coding (VLC) operations, and so forth.

The video decoder applies entropy coding operations, linear or non-linear dequantization operations, etc., that mirror or correspond to the entropy coding operations, the linear or non-linear dequantization operations, etc., performed by the video encoder to decode or recover the non-random-access sequence of residual image blocks (210) from the bitrate efficient representation included in the non-random-access video stream (212).

The video decoder applies VLC coding operations that mirror or correspond to the VLC coding operations performed by the video encoder to decode or recover the non-random-access sequence of image metadata (208) from the bitrate efficient representation included in the non-random-access video stream (212).

Based on the image metadata and the image data including but not limited to the non-random-access sequence of residual image blocks (210) and the non-random-access sequence of image metadata (208) as decoded or retrieved from the non-random-access video stream (212), the video decoder generates a reconstructed version of an image (e.g., 100 of FIG. 1A or FIG. 1B, etc.) or a non-random-access sequence of image blocks 104, which comprises individual image blocks 104-1, 104-2, 104-3, 104-4, . . . , etc., in a specific non-random-access image block processing (or decoding) order (e.g., raster, zigzag, etc.) corresponding to the specific non-random-access image block processing (or encoding) order (e.g., raster, zigzag, etc.) implemented by the video encoder.

In some operational scenarios, the non-random-access sequence of residual image blocks (210) and the non-random-access sequence of image metadata (208) are sufficient to allow or enable the recipient device to generate the non-random-access sequence of predicted image blocks (210).

More specifically, each predicted image block (e.g., 206-4, etc.) in the non-random-access sequence of predicted image blocks (210) may be generated by the recipient device through performing decoder-side prediction operations that mirror or correspond to the (encoder-side) prediction operations performed by the video encoder. The decoder-side prediction operations may perform the same intra or inter prediction, as performed by the video encoder, that uses the same neighbor information in the same image or the same reference image block(s) in the same reference images to generate or construct each such predicted image block (206-4 in the present example). Here, the neighbor information in the same image or the reference image block(s) in the reference images may be constructed in accordance with the same non-random-access processing order applied by the video encoder.

In operational scenarios in which intra prediction is used to construct the predictive image block (206-4 in the present example), the neighbor information in the same image used in the intra prediction may be derived from decoded/reconstructed image blocks generated based on (1) residual image blocks no later than the residual image block corresponding to the predicted image block (206-4 in the present example) and (2) image metadata portions no later than the image metadata portion (e.g., 208-4 in the present example) corresponding to the predicted image block (206-4 in the present example).

In operational scenarios in which inter prediction is used to construct the predictive image block (206-4 in the present example), the reference image block(s) in the reference images used in the inter prediction may be derived from decoded/reconstructed image blocks generated prior to the image to which the predictive image block (206-4 in the present example) belongs.

In an example, on the encoder side as illustrated in FIG. 2B, the non-random-access sequence of predicted image blocks (210) may be processed into a bitrate efficient representation and encoded—along with the non-random-access sequence of residual image blocks (210) and the non-random-access sequence of image metadata (208)—into the non-random-access video stream (212), for example through VLC operations, linear or non-linear quantization operations, entropy coding operations, etc. For example, the non-random-access sequence of predicted image blocks (210) in the bitrate efficient representation may be encoded as a relatively low quality version of images represented in the non-random-access video stream (212).

In the present example in which the non-random-access sequence of predicted image blocks (210) is encoded into the non-random-access video stream (212) along with the non-random-access sequence of residual image blocks (210) and the non-random-access sequence of image metadata (208), on the decoder side as illustrated in FIG. 2C, the non-random-access sequence of predicted image blocks (210) in the bitrate efficient representation may be used along with image metadata represented in the non-random-access sequence of image metadata (208) to reconstruct a non-random-access sequence of predicted image blocks (210) in a specific representation (e.g., in a specific transform or frequency domain, in a specific spatial domain, in a specific color space, compatible with a representation in which the non-random-access sequence of residual image blocks (210) is represented or converted, etc.). The non-random-access sequence of predicted image blocks (210) in the specific representation may be combined on the decoder side with the non-random-access sequence of residual image blocks (210) to generate a relatively high quality version of images represented in the non-random-access video stream (212).

In the present example in which the non-random-access sequence of predicted image blocks (210) is encoded into the non-random-access video stream (212) along with the non-random-access sequence of residual image blocks (210) and the non-random-access sequence of image metadata (208), the decoder-side prediction operations may perform the same intra or inter prediction, as performed by the video encoder, that uses the same neighbor information in the same image or the same reference image block(s) in the same reference images to generate or construct each such predicted image block (206-4 in the present example). Here, the neighbor information in the same image or the reference image block(s) in the reference images may be constructed in accordance with the same non-random-access processing order applied by the video encoder.

In operational scenarios in which intra prediction is used to construct the predictive image block (206-4 in the present example), the neighbor information in the same image used in the intra prediction may be derived from decoded/reconstructed image blocks generated based on (1) residual image blocks no later than the residual image block corresponding to the predicted image block (206-4 in the present example) and (2) image metadata portions no later than the image metadata portion (e.g., 208-4 in the present example) corresponding to the predicted image block (206-4 in the present example).

In operational scenarios in which inter prediction is used to construct the predictive image block (206-4 in the present example), the reference image block(s) in the reference images used in the inter prediction may be derived from decoded/reconstructed image blocks generated prior to the image to which the predictive image block (206-4 in the present example) belongs.

Under the approaches of FIG. 2B and FIG. 2C, the non-random-access processing order used to generate the non-random-access video stream (212)—e.g., a coded bitstream, a bitstream coded based on coding syntaxes defined or specified in standard or proprietary specifications, etc.—is to be faithfully observed by a recipient device operated by a viewer. In some operational scenarios, the non-random-access video stream (212) may or may not be able to deliver or stream video in a manner responsive to or dependent on a viewer's view direction as contemporaneously determined in real time or near real time while the streamed video is being rendered to the viewer. For example, predictive coding operations, VLC operations, etc., to be performed by the recipient device are dependent on image block specific coding contexts (e.g., image-block-specific probability metrics or values estimated for next codeword or byte occurrence(s), dynamically changeable values from image block to image block, etc.) used to encode the non-random-access video stream (212). These image block specific coding contexts may be (e.g., adaptively, dynamically, individually, incrementally, etc.) maintained, updated and/or applied in connection with some or all the prediction operations, the VLC operations, etc., and may be stored in or accessed from a memory of the video encoder and/or the video decoder.

In the process of decoding an image (e.g., 100 of FIG. 1A or FIG. 1B) represented in the non-random-access video stream (212), the video decoder maintains a decoder-side state machine which is used to decode the non-random-access video stream (212) in the same non-random-access processing order as used, implemented and/or applied by the encoder side. The decoder-side state machine keeps updating the image-block-specific coding contexts (e.g., image-block-specific probability metrics or values estimated for estimated for next codeword or byte occurrence(s), dynamically changeable values from image block to image block, etc.) based at least in part on prior codeword or byte occurrence(s).

As illustrated in FIG. 2B, in the encoding process of the video encoder, the encoder-side operations (202) update or maintain a non-random-access sequence of image-block-specific coding contexts comprising individual image-block-specific coding contexts 204-1, 204-2, 204-3, 204-4, etc.

The individual image-block-specific coding contexts (204-1, 204-2, 204-3, 204-4, etc.) correspond to their respective predictive image blocks (206-1, 206-2, 206-3, 206-4, etc.), their respective image metadata portions (208-1, 208-2, 208-3, 208-4, etc.), their respective residual image blocks, and so forth, in the bitrate efficient representation or a prior representation from which the bitrate efficient representation is derived. For example, the encoder-side operations (202) or by an encoder-side state machine employed in the encoder-side operations (202) can use or apply the individual image-block-specific coding contexts (204-1, 204-2, 204-3, 204-4, etc.) to generate or construct their respective predictive image blocks (206-1, 206-2, 206-3, 206-4, etc.), their respective image metadata portions (208-1, 208-2, 208-3, 208-4, etc.), their respective residual image blocks, and so forth, in the bitrate efficient representation or the prior representation.

As illustrated in FIG. 2B, the video encoder or the encoder-side state machine processes image blocks or slices in the non-random-access processing order by maintaining, updating and/or using individual image-block-specific coding contexts (204-1, 204-2, 204-3, 204-4, etc.) to generate or construct the respective predictive image blocks (206-1, 206-2, 206-3, 206-4, etc.), the respective image metadata portions (208-1, 208-2, 208-3, 208-4, etc.), the respective residual image blocks, etc.

As illustrated in FIG. 2C, the video decoder or the decoder-side state machine processes image blocks or slices in the same non-random-access processing order by maintaining, updating and/or using individual image-block-specific coding contexts (254-1, 254-2, 254-3, 254-4, etc.)—which are the same as or equivalent to the individual image-block-specific coding contexts (204-1, 204-2, 204-3, 204-4, etc.)—to generate or construct the respective predictive image blocks (206-1, 206-2, 206-3, 206-4, etc.), the respective image metadata portions (208-1, 208-2, 208-3, 208-4, etc.), the respective residual image blocks, etc.

Within an image (e.g., 100 of FIG. 1A or FIG. 1B, etc.) or a slice of the image (100), a macroblock/block structure (e.g., as represented in a coding tree unit or a macroblock/block structure, etc.) of the slice is encoded or decoded in the same processing order. The same or equivalent coding contexts (e.g., probability metric or values, dynamically changeable values, etc.) are used at both the video encoder and the video decoder. For example, the image block specific coding context (204) or (254) can be built up from the video encoder or the video decoder from image lock specific coding contexts (204-1 through 204-3) or (254-1 through 254-3) in the same processing order. Both the video encoder and the video decoder can use the same neighboring or reference block data such as intra prediction direction or motion vectors, as determined or generated based on the same or equivalent coding contexts built in accordance with the same non-random-access processing order, to predict current image block(s) through intra prediction or inter prediction.

In operational scenarios in which the video decoder might use a different processing order from the encoder-side processing order such as one based on the viewer's direction, as compared with the encoder-side coding contexts, different coding contexts could be accumulated by the video decoder along the different processing order. As a result, image data and image metadata as represented in the non-random-access video stream (212) could be incorrectly decoded or recovered by the video decoder.

For example, VLC coding operations on the encoder side may use a VLC codebook (or a VLC table) that indicates a 8-bit value of 'c' is assigned a VLC code of 0 for coding and decoding a first image block based on previously seen probability metrics or values of the 8-bit value of 'c' prior to or up to the first image block. Subsequently, the VLC coding operations on the encoder side may use an updated VLC codebook (or an updated VLC table) that indicates a 8-bit value of 'd' is assigned the VLC code of 0 for coding and decoding a second image block subsequent to the first image block based on (additional) previously seen probability metrics or values of the 8-bit value of 'd' prior to or up to the second image block. If VLC coding operations on the decoder side keeps using the same VLC codebook (or the same VLC table), the VLC code of 0 may be incorrectly interpreted for the second image block, unless the VLC coding operations on the decoder side can use additional update information to set up or update the VLC codebook (or the VLC table) correctly for interpreting image data of the second image block.

Thus, under other approaches that do not implement random-access techniques as described herein, the video decoder would not be allowed or enabled to decode image blocks or slices represented in the non-random-access video stream (212) in violation of the non-random-access processing order adopted by the video encoder based on the encoder-side coding contexts. For the purpose of illustration only, assume that the video decoder might be allowed under these other approaches to make a random access to (1) the residual image block corresponding to the predicted image block (206-4 in the present example), (2) the image metadata portion (208-4) and/or (3) the predictive image block (206-4) before making access to other residual image blocks preceding the random accessed image block corresponding to the predicted image block (206-4 in the present example). However, as other image metadata portions (e.g., 208-2, 208-3, etc.) preceding the random accessed image metadata portion (208-4) and/or other predictive image blocks (e.g., 206-2, 206-3, etc.) preceding the random accessed predictive image block (206-4) had not been accessed, the video decoder's state or coding context (e.g., probability metrics or values, for prediction operations, for VLC operations, etc.) would not be properly updated for the purpose of correctly decoding the random accessed residual image block corresponding to the predicted image block (206-4 in the present example), image metadata portion (208-4) and/or predictive image block (206-4).

Under techniques as described herein, there is no need to regenerate slices or image blocks or image data (e.g., pixel values, transform coefficients, residual image data, base layer image data, image data to regenerate or reconstruct predicted image blocks, etc.) therein. A non-random-access video stream can be modified by an upstream device such as a video streaming server to allow or enable a video decoder operated by a viewer to make random access to individual slices and/or image blocks of images rendered on an image display device, while each of the individual random accessed slices and/or image blocks remains coded with the same image data as generated by a non-random-access video encoder.

In some operational scenarios, random access as described herein may be based on the viewer's view directions such that the random accessed slices and/or image blocks correspond to or cover the viewer's view directions, the viewer's viewports or ROIs contemporaneously determined in real time or in near real time based on real time or near real time sensory data collected from the viewer.

Random access image metadata can be generated and sent by the video streaming server to the video decoder to place the video decoder in a specific codec state to correctly interpret image data coded by a non-random-access video encoder in the now random accessed slices and/or image blocks. The random access image metadata may be generated or regenerated from image metadata and image data of the non-random-access video stream.

For example, a random access image metadata portion may be generated or regenerated by the video streaming server with respect to an image block to be reconstructed by the video decoder. The random access image metadata portion may be received and used by the video decoder and is sufficient to place the video decoder in a specific codec to correctly (e.g., normally, without misinterpretation, etc.) interpret image data (e.g., originally, previously, etc.) encoded by the non-random-access video encoder for the image block.

4. View Direction Dependent Processing Orders

Figure 3A:
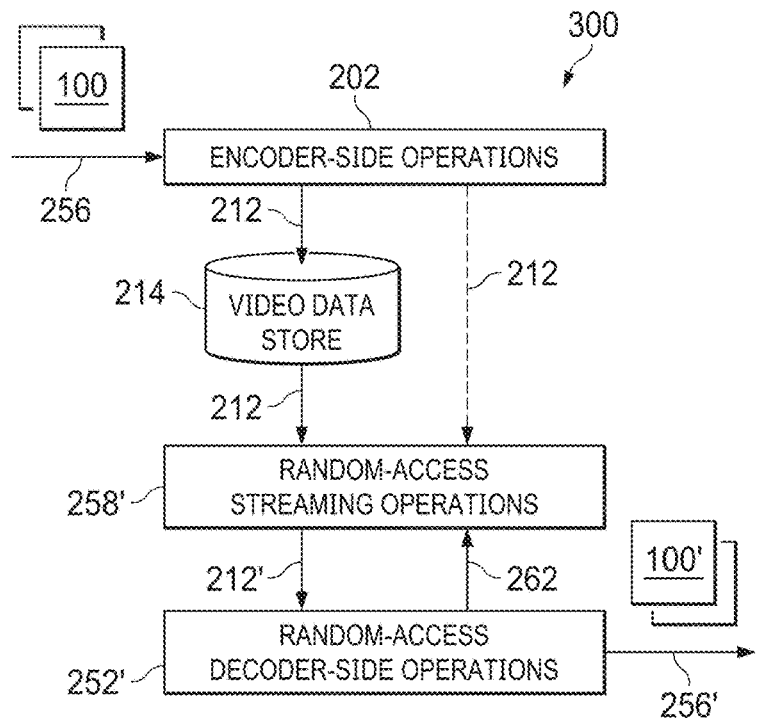
FIG. 3A through FIG. 3C illustrate example video delivery pipeline and example codecs for random-access image data processing.

FIG. 3A illustrates an example modified video delivery pipeline 300, in which a source video stream is received by the pipeline (300) as input from an external video data source, and a target video stream is outputted by the pipeline (300) as output for rendering to a viewer.

The source video stream is encoded with a sequence of (e.g., relatively high quality, uncompressed, less compressed, etc.) source video images 256 including but not limited to the image (100) of FIG. 1A or FIG. 1B.

The modified video delivery pipeline (300) includes a video encoder that performs (non-random-access) encoder-side operations 202. The encoder-side operations (202) split or partition each source video image in the sequence of source video images 256 into respective source image blocks of each such source video image. The encoder-side operations (202) access, process and/or encode, in a non-random-access image block processing order, the respective image blocks to generate compressed non-random-access image blocks corresponding to the respective source image blocks. The compressed non-random-access image blocks are encoded into a non-random-access video stream 212. In some operational scenarios, the non-random-access video stream (212) is delivered to a recipient random-access streaming server (or streamer) along with non-residual auxiliary data such as neighboring intra/inter prediction estimates, QP (quantization parameter) values, VLC states, etc., for each block (e.g., macroblock, etc.) or subblock of the image/frame. The recipient random-access video streaming server (or streamer) can use this non-residual auxiliary data to create image metadata or portions thereof that are sent in response to a random access request. The non-residual auxiliary data may be captured as (image) metadata by the non-random-access encoder and stored as additional or attendant data. In an example, the random access streaming server can receive and use the image metadata from the non-random-access encoder. In another example, the random access streaming server can run a full decoding process (and/or a full encoding process) to generate this (image) metadata. Additionally, optionally or alternatively, the image metadata received from the non-random-access encoder or generated by the random-access video streaming server may include intra/inter prediction information, QP values VLC states, etc., relating to some or all of current, target, neighboring and/or reference blocks. Additionally, optionally or alternatively, in some operational scenarios in which residual motion vectors and intra modes with prediction are higher than sending full motion vectors and zero prediction, the random-access streaming server can make a decision to send re-encoded full motion vectors. Additionally, optionally or alternatively, the image metadata received from the non-random-access encoder or generated by the random-access video streaming server may include metadata of types that may or may not generally stored by a (e.g., traditional, etc.) video encoder even though the video encoder generates the metadata in its operations. In some operational scenarios, an encoder such as the non-random-access encoder may be modified to keep outputting this metadata over time, for example to the random-access video streaming server or to a media file stored in a storage medium to be accessed by the random-access video streaming server.

The non-random-access video stream (212) is delivered to the recipient random-access streaming server directly or indirectly over one or more first data links (or first computer network paths) with relatively high bandwidth, relatively low latency, etc.

In a first example, the non-random-access video stream (212) may be first outputted by the encoder-side operations (202) of the video encoder and stored on a tangible computer-readable storage medium such as a video data store 214, and then retrieved by a random-access streaming server (or a random-access recoding server) from the tangible computer-readable storage medium.

In a second example, the non-random-access video stream (212) may be outputted by the encoder-side operations (202) of the video encoder to the random-access streaming server (or random-access recoding server) directly.

The random-access streaming server of the modified video delivery pipeline (300) performs random-access streaming operations (258') to generate specific image metadata (which is to be included in a modified sequence of image metadata (208' of FIG. 3B) carried or delivered with a modified video stream 212') for supporting random access to slices and/or image blocks represented in the non-random-access video stream (212) in violation of the non-random-access image block processing order. Instead of streaming the non-random-access video stream (212), the random-access streaming server generates—e.g. from image data and image metadata received in the non-random-access video stream (212)—a modified video stream 212' that includes the specific image metadata and streams the random accessed slices and/or image blocks with the specific image metadata in the modified video stream 212' to a recipient (e.g., random-access, etc.) video decoder over one or more second data links (or second computer network paths). The second data links may be with relatively low bandwidth, relatively high latency, etc., as compared with the first data links (or the first computer network paths). The random accessed slices and/or image blocks may be selected, for example based at least in part on view direction data 262 received from the video decoder, by the video streaming server from among some or all the image blocks to be streamed.

The video decoder of the modified video delivery pipeline (300) performs random-access decoding operations 252' on the modified video stream (212') to uncompress compressed image blocks—including random-accessed slices or image blocks of images that have been expedited for delivery by the random-access video streaming server—encoded in the modified video stream (212'). Random access image metadata in the modified video stream (212') can be used by the video decoder to correctly interpret image data in the random-accessed slices or image blocks and to generate a modified reconstructed version 256' of the sequence of source video images. By way of example but not limitation, the modified reconstructed version (256') may include an image 100' (e.g., which may be the same as the image (100') of FIG. 1C, etc.) representing a modified reconstructed version of an image 100 (e.g., which may be the same as the image (100) of FIG. 1A or FIG. 1B, etc.). In the modified reconstructed version (256'), reconstructed image blocks corresponding to the random-accessed slices or image blocks (e.g., 104-4 of FIG. 1C, etc.) can be outputted to an image rendering device or a target image display relatively expeditiously (e.g., before 104-2 and 104-3 of FIG. 1C, etc.) for rendering to a viewer.

Figure 3B:
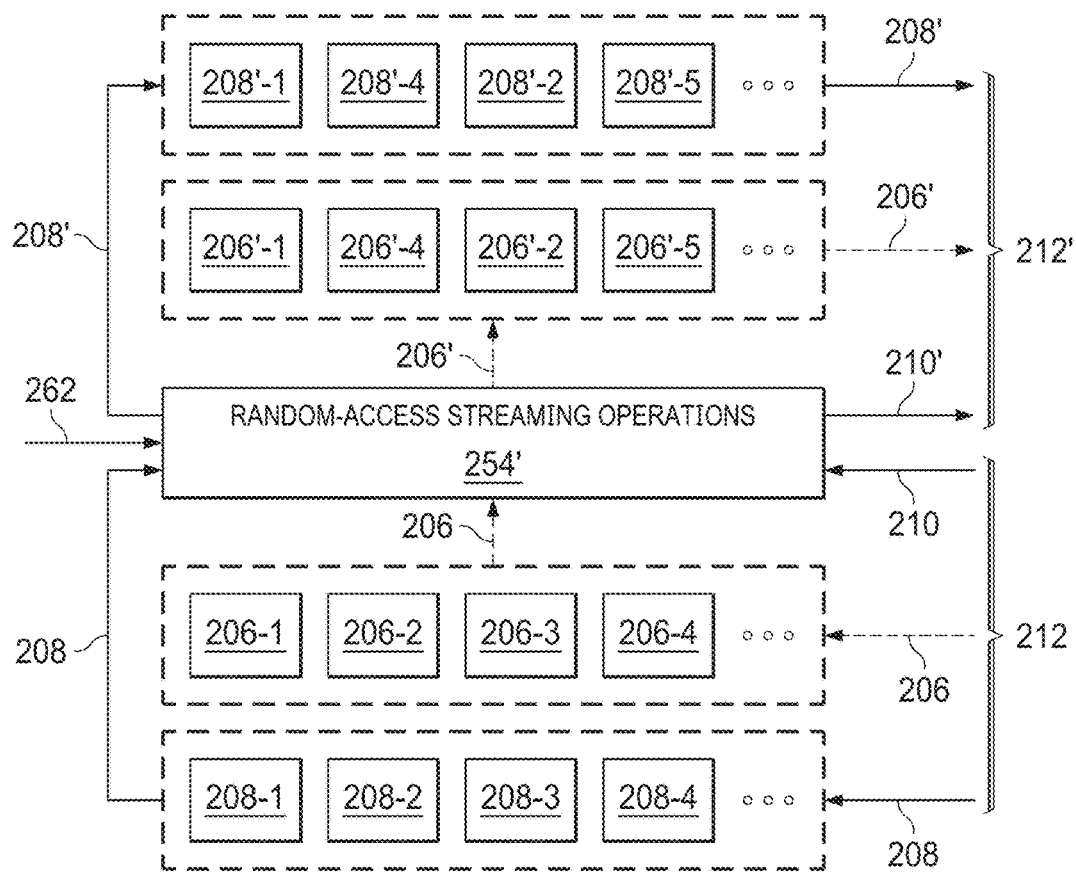

FIG. 3B illustrates example (random-access) streaming operations 258' as described with reference to FIG. 3A of a video streaming process performed by a video processing device such as a video streaming server. The random-access streaming operations (258') may include, but are not necessarily limited to only: prediction operations, filtering operations, quantization operations, dequantization operations, transformation operations, inverse transformation operations, addition operations, subtraction operations, multiplying operations, division operations, entropy coding operations, variable length coding (VLC) operations, and so forth.

The video streaming server receives the real time or near real time view direction data (262) from the video decoder, uses the view direction data (262) to identify slices and/or image blocks (e.g., corresponding to or covering the viewer's view directions, view ports and/or ROIs, etc.) in the non-random-access video stream (212) to be random accessed based at least in part on the view direction data 262 from the video decoder, generates random access image metadata from image metadata and image data as decoded, retrieved and/or determined from the non-random-access video stream (212). The video streaming server generates the modified video stream (212') that packages image data of the random accessed slices and/or image blocks with the random access image metadata in the modified video stream (212') to expedite the delivery and rendering of the image data in the random accessed slices and/or image blocks. The random access image metadata as packaged in the modified video stream (212') with the image data of the random accessed slices and/or image blocks allows or enables the video decoder to correctly interpret image data in the random accessed slices and/or image blocks.

As illustrated in FIG. 3B, the modified video stream (212') comprises a modified sequence of residual image blocks (210') and a modified sequence of image metadata (208'). In some operational scenarios, residual image blocks as described herein are a result of spatial/temporal predictions and residue from original image and predicted image. The residual image blocks (e.g., generated by the non-random-access encoder, etc.) may go through encoding operations such as DCT quantization to be encoded by the random-access streaming server in an output coded bitstream without being modified by the random-access streaming server. By way of comparison, in some operational scenarios, the residual image blocks generated form original image and predicted images—e.g., by the non-random-access encoder, etc.—may be changed by the random-access streaming server; the changed residual image blocks may go through encoding operations such as DCT quantization to be encoded by the random-access streaming server in an output coded bitstream. Additionally, optionally or alternatively, in some operational scenarios, a modified sequence of predicted image blocks (206') may also be included in the modified video stream (212'), for example in a base layer carrying a relatively low quality version of images that depict the same scenes/contents represented in the received non-random-access video stream (212).

While the images are being rendered by the video decoder to the viewer, the video decoder operates with one or more sensors or eye tracking devices to collect real time or near real time sensory data in connection with the viewer. The video decoder generates the view direction data from the collected real time or near real time sensory data and sends the view direction data to the video streaming server.

By way of example but not limitation, the video streaming server initially accesses a residual image block, an image metadata portion 208-1 and/or a predicted image block 206-1, in the non-random-access video stream (212), that collectively correspond to the image block (104-1) of the image (100') of FIG. 1C. The residual image block, the image metadata portion (208-1) and/or the predicted image block (206-1) may be processed, packages or encoded into the modified video stream (212'). The residual image block is included (e.g., as is, etc.) in the modified sequence of residual image blocks; an image metadata portion 208'-1, which may be the same as the image metadata portion (208-1) or modified based on the viewer's view direction, is included in the modified sequence (208') of image metadata; the predicted image block (206-1) is included (e.g., as is, etc.) in the modified sequence (206') of predicted image blocks. The residual image data, the image metadata portion (208'-1) and/or the predictive image block (206'-1) in the modified sequences (210', 208' and/or 206') are streamed by the video streaming server to the video encoder.

Subsequently, the video streaming server receives, from the video decoder, the real time or near real time view direction data (262) that indicates the viewer's view direction currently, in real time or near real time, corresponds to the image block (104-4) of the image (100') of FIG. 1C.

In response, instead of (e.g., immediately, next, etc.) streaming image data of the image blocks (104-2) and (104-3), the video streaming server (e.g., immediately, next, etc.) generates a random access image metadata portion 208'-4 that can be sent to the video decoder to allows or enable the video decoder to (e.g., immediately, next, etc.) reconstruct the image block (104-4) that corresponds to or covers the viewer's view direction.

More specifically, the video streaming server accesses residual image blocks, image metadata portions 208-2 through 208-4 and/or predicted image blocks 206-2 through 206-4, in the non-random-access video stream (212), that represent image data and image metadata corresponding to image blocks (e.g., 104-2, 104-3 and 104-4, etc.) up to the image block (104-4) of the image (100') of FIG. 1C. Based on the image data and image metadata, the video streaming server generates a random access image metadata portion 208'-4. The video streaming server includes or encodes the random access image metadata portion in the modified video stream (212') along with a residual image block and/or a predicted image block 206-4 both of which correspond to the image block (104-4) of the image (100').

The residual image block and/or the predicted image block (206-4) encoded in the random-access video stream (212') may be the same as those decoded or received from the non-random-access video stream (212), whereas the image metadata portion (208'-4) may be different from the image metadata portion (208-4) received from the non-random-access video stream (212).

A recipient device of the image metadata portion (208-4), without receiving prior image data and prior image metadata corresponding to the image blocks (104-2) and (104-3), cannot correctly interpret the image data in the residual image block and the predicted image block (206-4) corresponding to the image block (104-4).

In contrast, a recipient device of the image metadata portion (208'-4), without receiving prior image data and prior image metadata corresponding to the image blocks (104-2) and (104-3), can correctly interpret the image data in the residual image block and the predicted image block (206-4) corresponding to the image block (104-4), as the image metadata portion (208'-4) is specifically generated to allow or enable the recipient device to correctly interpret the image data in the residual image block and the predicted image block (206-4) corresponding to the image block (104-4).

Figure 3C:
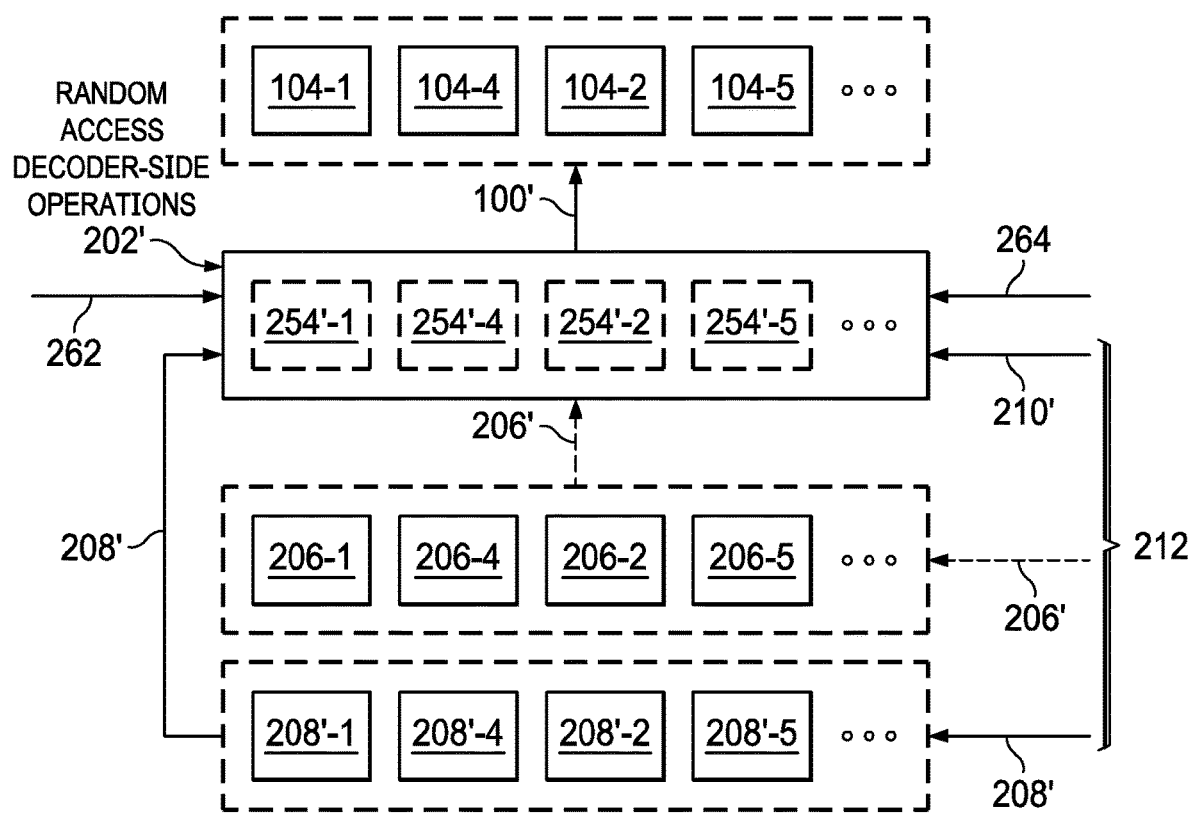

FIG. 3C illustrates example (random-access) decoder-side operations 252' of a decoding process performed by a recipient device (or a decoder device) of the modified video stream (212'). These decoder-side operations (252') may include, but are not necessarily limited to only: prediction operations, filtering operations, quantization operations, dequantization operations, transformation operations, inverse transformation operations, addition operations, subtraction operations, multiplying operations, division operations, entropy coding operations, variable length coding (VLC) operations, and so forth.

The video decoder continuously (e.g., on a periodic basis, on a polling schedule, over a plurality of time points in a user session of an AR, VR or immersive video application, etc.) receives or collects real time or near real time sensory data 264 from one or more sensors or eye tracking devices operating in conjunction with the video decoder. The sensory data (264) is continuously used by the video decoder to determine the viewer's view directions, viewports or ROIs contemporaneously in real time or in near real time (e.g., on a periodic basis, on a polling schedule, over a plurality of time points in a user session of an AR, VR or immersive video application, etc.) while the viewer is viewing rendered images derived from the modified video stream (212').

The video decoder sends, to the random-access video streaming server, real time or near real time view direction data (262) generated from the sensory data (264). The view direction data (262) indicates the viewer's view directions, viewports or ROIs.

In the meantime, the video decoder receives, from the random-access video streaming server, the modified video stream (212' of FIG. 3A or FIG. 3B), which may be generated by modifying the non-random-access video stream (212 of FIG. 2A) based at least in part on the view direction data (262). The modified video stream (212') comprises the modified sequence of residual image blocks and the modified sequence of image metadata (208').

Additionally, optionally or alternatively, in some operational scenarios, the modified video stream (212') comprises the modified sequence of predicted image blocks (208') in a bitrate efficient representation, for example as base layer image data to provide a relatively low quality version of the video content depicted in both the non-random-access video stream (212) and the modified video stream (212').

In these modified sequences of residual image blocks, image metadata and/or predicted image blocks, a (random-access) processing order (e.g., encoding/decoding order, etc.) has been implemented to allow or enable the video decoder to (e.g., immediately, next, etc.) access, decode and/or render image blocks that correspond to or cover the viewer's real time or near real time view direction, viewport or ROI contemporaneously determined while the viewer is viewing the rendered images from the modified video stream (212').

As illustrated in FIG. 2B and FIG. 2C, the non-random-access video stream (212) is encoded in the non-random-access processing order with image data and image metadata corresponding to the image block (104-2) of the image (100) of FIG. 1A or FIG. 1B, after being encoded with image data and image metadata corresponding to the image block (104-1) of the image (100) of FIG. 1A or FIG. 1B, even if a viewer's contemporaneous or predicted view direction may be directed at a location corresponding to a different image block such as the image block (104-4).

In comparison, as illustrated in FIG. 3B and FIG. 3C, the modified video stream (212') is encoded in the random-access processing order with image data and image metadata corresponding to the image block (104-4) of the image (100) of FIG. 1A or FIG. 1B, after being encoded with image data and image metadata corresponding to the image block (104-1) of the image (100) of FIG. 1A or FIG. 1B, in response to determining that the viewer's contemporaneous or predicted view direction is directed at a location corresponding to a different image block such as the image block (104-4).

Thus, the video decoder uses the modified video stream (212') to process and render image data and image metadata in the random-access processing order different from the non-random-access processing order used by the video encoder to generate the non-random-access video stream (212). The random-access processing order as enabled by the modified video stream (212') prioritizes the processing, encoding and delivery of image data and image metadata of image blocks that correspond to or cover the viewer's view directions, viewports or ROIs.

As illustrated in FIG. 3C, the modified sequence of predicted image blocks comprises 206-1, 206-4, 206-2, 206-5, etc., in accordance with the random-access processing order. Similarly, the modified sequence of image metadata comprises 208'-1, 208'-4, 208'-2, 208'-5, etc., in accordance with the random-access processing order.

As illustrated in FIG. 3C, the video decoder performs random access decoder-side operations 202' to generate or construct images (e.g., the image (100') of FIG. 1C, etc.) to be rendered to the viewer. The decoder-side operations (202') can use or implement a state machine; receive the modified sequences of residual image blocks, image metadata and/or predicted image blocks; maintain and update, for the state machine, individual image-block-specific coding contexts (e.g., 254'-1, 254'-4, 254'-2, 254'-5, etc.) based at least in part on these modified sequences of image data and image metadata; use the individual image-block-specific coding contexts (254'-1, 254'-4, 254'-2, 254'-5, etc.) to process, generate, construct and/or reconstruct image blocks or slices (e.g., 104-1, 104-4, 104-2, 104-5, etc.) of the images (e.g., 100', etc.) in the random-access processing order.

For example, the video decoder receives an image metadata portion 208'-4 in conjunction with a residual image block and/or a predicted image block 206-4, all of which correspond to and are to be used to reconstruct the image block (104-4) after the image block (104-1) has been reconstructed on the decoder side. The video decoder can use the image metadata portion 208'-4 as well as the image block (104-1) and other already received or already decoded image data and image metadata to place the video decoder in a specific codec state as represented by a coding context 254'-4 (which may be the same as or equivalent to a coding context 254 of FIG. 2C) to perform prediction operations, VLC operations, etc., correctly with respect to the residual image block and/or the predicted image block (206-4) for the purpose of reconstructing the image block (104-4), even when the video decoder has yet to receive image data and image metadata for reconstructing the image blocks (104-2) and (104-3).

The modified sequence of image metadata (208') generated and sent by the random access streaming server to the video decoder enables the video decoder to receive and process image blocks out of order with respect to the non-random-access processing order. Under techniques as described herein, viewer-specific video streams can be dynamically created based on viewers' respective view directions, viewports or ROIs contemporaneously determined while the viewers are viewing images from the viewer-specific video streams. While modified image metadata is sent to a recipient decoder, the same image data such as the same residual image blocks and/or predicted image blocks can be sent to the recipient video decoder. As a result, image data such as residual image blocks and/or predicted image blocks need not be recoded on the encoder side, thereby avoiding restarting or resetting—which may be lengthy—decoding operations performed by the video decoder caused by image data recoding that may invalidate earlier received image data on the decoder side.

The modified sequence of image metadata (208') can be used to convey a correct coding state for the video decoder to support random access of image blocks corresponding to a viewer's view direction, viewport or ROI. The modified sequence of image metadata (208'), along with possibly other image metadata or image data already received or already constructed by the video decoder, provides enough information for performing decoder-side operations (e.g., with respect to an expedited image block, etc.) including but not limited to setting up state machines for VLC coding, sending neighboring block or pixel metrics or values for intra prediction, sending motion vector information for inter prediction, sending arithmetic states for entropy coding, etc., so that image data and image metadata for an image block (or an expedited image block) currently being processed or reconstructed can be correctly and efficiently decoded as if all image data and image metadata for image blocks (e.g., 104-2 and 104-3, etc.) along the non-random-access processing order have already been delivered and received by the video decoder.

Random access image metadata such as the modified sequence of image metadata (208') may be carried by the modified video stream (212') in one or more of a variety of image metadata delivery methods. In a non-limiting example, some or all the random access image metadata may be sent in the modified video stream (212') as Supplemental Enhancement Information (SEI) information metadata. In another non-limiting example, some or all the random access image metadata may be sent in image metadata container based on existing or newly defined video bitstream coding syntax(es) in the modified video stream (212'). Additionally, optionally or alternatively, packets carrying some or all random access image metadata may be sent as a part of, a separate stream or a sub-stream with the modified video stream (212').

In some operational scenarios, at least some random access image metadata may be generated by a video decoder from relatively low quality (e.g., a relatively low resolution, a relatively low dynamic range, a relatively narrow color gamut as compared with those of a relatively high quality version, etc.) base layer image data (e.g., predicted image blocks 206, etc.) that has been previously received by the video decoder. For example, motion vectors or differences/updates thereof may be derived by the video decoder from the base layer image data instead of being signaled through the modified sequence of image metadata generated and sent by the video streaming server. As a result, at least some random access image metadata may be made or estimated just in time (e.g., used as a fallback strategy, etc.) without receiving such image metadata from the video streaming server to construct a relatively high quality version (e.g., a relatively high resolution, a relatively high dynamic range, a relatively wide color gamut as compared with those of a relatively low quality version, etc.) of images from a video stream as described herein, albeit there may exist some artifacts caused by relatively inaccurate or relatively low resolution motion vector information generated from the base layer image data.

In some operational scenarios, a reduced version of image data from image blocks that have yet to be delivered may be generated. For example, DC values (e.g., a least significant 7 bit part of an 8-bit image data value, half of an image data value, a one bit shift of an image data value, etc.) may be determined or derived from the image blocks yet to be delivered. The reduced version of image data may be delivered—for example, in a separate stream to or a sub stream of a video stream, to a video decoder—to allow or enable the video decoder to use the reduced version of image data to estimate prediction information, perform DC mode prediction operations and generate or construct an image block that corresponds to or covers a viewer's view direction, viewport or ROI.

Example random access image metadata may include, but is not necessarily limited to only, any of: prediction modes or triggers for intra and/or inter prediction, neighbor image data, motion vectors, VLC coding state information, and so forth. In some operational scenarios, instead of directly sending neighbor image data and motion vectors, differences (or updates) between current neighbor image data and previous neighbor image data and between current motion vectors and previous motion vectors may be sent by the video streaming server to the video decoder. Similarly, instead of directly sending VLC coding state information, differences (or updates) of the VLC coding state information may be sent by the video streaming server to the video decoder. As the video decoder maintains coding states (or coding contexts), the received differences (or updates) may be added—or may be used as updates—to existing values in the existing coding states (or coding contexts).

For the purpose of illustration only, it has been described that random access image metadata as described herein may include image metadata for prediction operations, VLC operations, etc. It should be noted that random access image metadata for other image processing or construction operations including but not limited to filtering operations, interpolation operations, etc., may also be used to enable random access of image blocks.

As used herein, video content in a video stream as described herein may include, but are not necessarily limited to, any of: audiovisual programs, movies, video programs, TV broadcasts, computer games, augmented reality (AR) content, virtual reality (VR) content, automobile entertainment content, etc. Example video decoders may include, but are not necessarily limited to, any of: display devices, a computing device with a near-eye display, a head-mounted display (HMD), a mobile device, a wearable display device, a set-top box with a display such as television, a video monitor, etc.

As used herein, a "video streaming server" may refer to one or more upstream devices that prepare and stream video content to one or more video streaming clients such as video decoders in order to render at least a portion of the video content on one or more displays. The displays on which the video content is rendered may be part of the one or more video streaming clients, or may be operating in conjunction with the one or more video streaming clients.

Example video streaming servers may include, but are not necessarily limited to, any of: cloud-based video streaming servers located remotely from video streaming client(s), local video streaming servers connected with video streaming client(s) over local wired or wireless networks, VR devices, AR devices, automobile entertainment devices, digital media devices, digital media receivers, set-top boxes, gaming machines (e.g., an Xbox), general purpose personal computers, tablets, dedicated digital media receivers such as the Apple TV or the Roku box, etc.

5. Example Process Flows

Figure 4A:
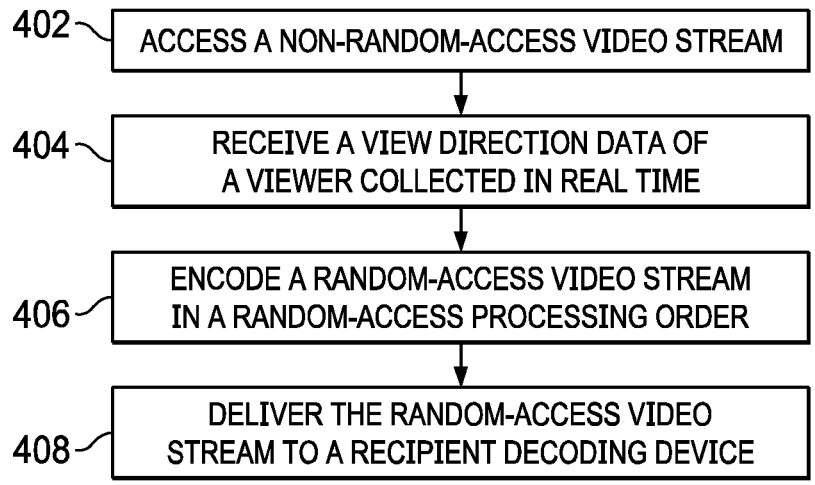
FIG. 4A and FIG. 4B illustrate example process flows.

FIG. 4A illustrates an example process flow according to an example embodiment of the present disclosure. In some example embodiments, one or more computing devices or components may perform this process flow. In block 402, an image processor (e.g., a video streaming server, a video encoder, a video content provider, a video transcoder, etc.) accesses a non-random-access video stream encoded with image blocks to be processed with a non-random-access processing order. A first image block of the image blocks is to be processed after one or more second image blocks in accordance with the non-random-access processing order.

In block 404, the image processor receives view direction data of a viewer collected in real time while the viewer is viewing video content of a random-access video stream. The random-access video stream is generated from the non-random-access video stream. The view direction data indicates the viewer's view direction coinciding with a location covered by the first image block while the viewer is viewing the video content of the random-access video stream. Additionally, optionally or alternatively, in some operational scenarios, temporal tracking of view directions of a viewer or a viewer population while a media program is being rendered to the user or user population may provide or form a (e.g., statistics-based, etc.) metric or a past history to be used by streaming servers as described herein to set or predict view directions of a new direction and to prepare or generate (or prime) image data and image metadata in accordance with the predicted view directions for delivering to downstream recipient streaming client devices. Additionally, optionally or alternatively, machine learning (ML) based techniques can be used or applied to identify region of interest (ROI) portions to which expected view directors are directed. Thus, a view direction at a given time point may be calculated based on statistical data or ML. Such a view direction may be used in real time or non-real-time operational scenarios to create random access of image data in the media program.

This approach can be applied to streaming media programs for which image metadata and image metadata has been coded without optimizing such coding for expected view directions. Thus, when such a media program is streamed or written by a random-access streaming server as described herein, the random-access streaming server can incorporate view directions statistically determined, ML predicted, etc., into real time or non-real-time media content consumption operations.

In block 406, the image processor encodes the first image block into the random-access video stream before the one or more second image blocks in a random-access processing order different from the non-random-access processing order. The random-access processing order is dependent of the viewer's view direction while video content of the random-access video stream is being rendered to the viewer. The non-random-access processing order is independent of the viewer's view direction.

In block 408, the image processor delivers the random-access video stream to a recipient decoding device operated by the viewer to cause the first image block to be processed and rendered from the random-access video stream before the one or more second image blocks in accordance with the random-access processing order.

In an embodiment, the non-random-access processing order represents one of: a raster order, a zigzag order or a view-direction-independent processing order.

In an embodiment, the first image block belongs to a group of two or more image blocks that cover the viewer's viewport; the one or more second image blocks are outside the viewer's viewport; the group of two or more image blocks including the first image block is expedited for delivery to the recipient decoding device before the one or more second image blocks.

In an embodiment, the first image block belongs to a group of two or more image blocks that cover the viewer's region of interest; the one or more second image blocks are outside the viewer's region of interest; the group of two or more image blocks including the first image block is expedited for delivery to the recipient decoding device before the one or more second image blocks.

In an embodiment, the non-random-access video stream comprises a first image metadata portion that is to be delivered along with the first image block; the first image metadata portion is used to transition a video codec from a previous coding state to a current coding state to decode the first image block; the previous coding state is used by the video codec to decode a previous image block that is to decoded before the first image block according to the non-random-access processing order.

In an embodiment, the random-access video stream comprises a first modified image metadata portion that is delivered along with the first image block to the recipient decoding device; the first modified image metadata portion is used to avoid going through the previous coding state according to the non-random-access processing order and to transition the recipient decoding device to the current coding state to decode the first image block; the first modified image metadata portion differs from the first image metadata portion.

In an embodiment, the first modified image metadata portion contains an update to a state for variable length coding operations; the first image metadata portion does not contain the update.

In an embodiment, the first modified image metadata portion contains an update to a state for predictive coding operations; the first image metadata portion does not contain the update.

In an embodiment, the random-access video stream is used to support one of: an augmented reality application, a virtual reality application, a cinema video application, a home-based video application, a video streaming application, a cloud-based video application, a Wi-Fi-based video application, a cellular-data-network-based video application, an immersive video application, etc.

Figure 4B:
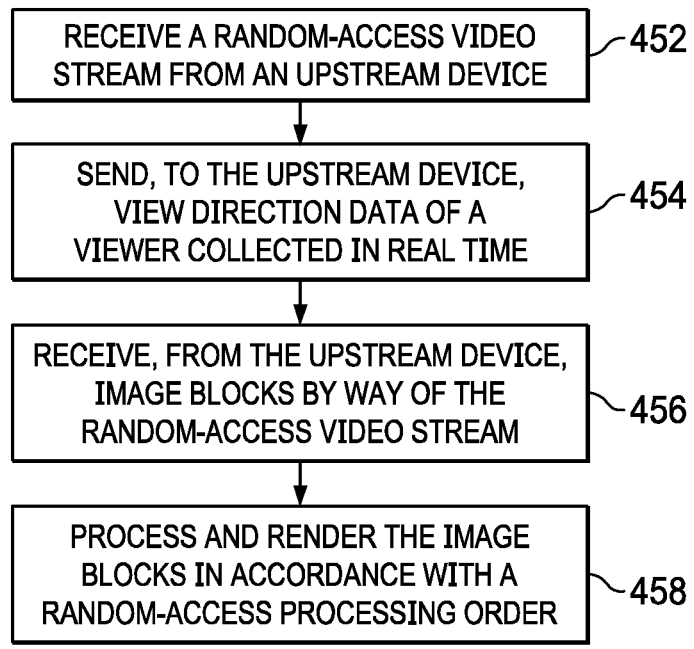

FIG. 4B illustrates an example process flow according to an example embodiment of the present disclosure. In some example embodiments, one or more computing devices or components may perform this process flow. In block 452, an image processor (e.g., a video streaming client, a video decoder, a set-top device, etc.) receives a random-access video stream from an upstream device. The random-access video stream is generated from a non-random-access video stream.

In block 454, the image processor sends, to the upstream device, view direction data of a viewer collected in real time while the viewer is viewing video content of the random-access video stream. The view direction data indicates the viewer's view direction coinciding with a location covered by a first image block of image blocks while the viewer is viewing the video content of the random-access video stream.

The non-random-access video stream is encoded with image blocks to be processed with a non-random-access processing order. The first image block of the image blocks is to be processed after one or more second image blocks in accordance with the non-random-access processing order.

The random-access processing order is dependent of the viewer's view direction while the video content of the random-access video stream is being rendered to the viewer. The non-random-access processing order is independent of the viewer's view direction.

In block 456, the image processor receives, from the upstream device, the first image block before the one or more second image blocks by way of the random-access video stream.

In block 458, the image processor processes and renders the first image block before the one or more second image blocks in accordance with the random-access processing order.

In an embodiment, the random-access video stream comprises base layer image data representing a relatively low quality version of the video content; the base layer image data is used to derive motion estimation; a relatively high quality version of the video content is generated based at least in part on the motion estimation as derived from the base layer image data and image data and image metadata as decoded from the random-access video stream.

In an embodiment, the first image block belongs to a group of two or more contiguous image blocks forming an image region that covers the viewer's direction; the one or more second image block are outside the image region; other images in the group of two or more contiguous image blocks are received, decoded and rendered before the one or more second image blocks.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

6. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
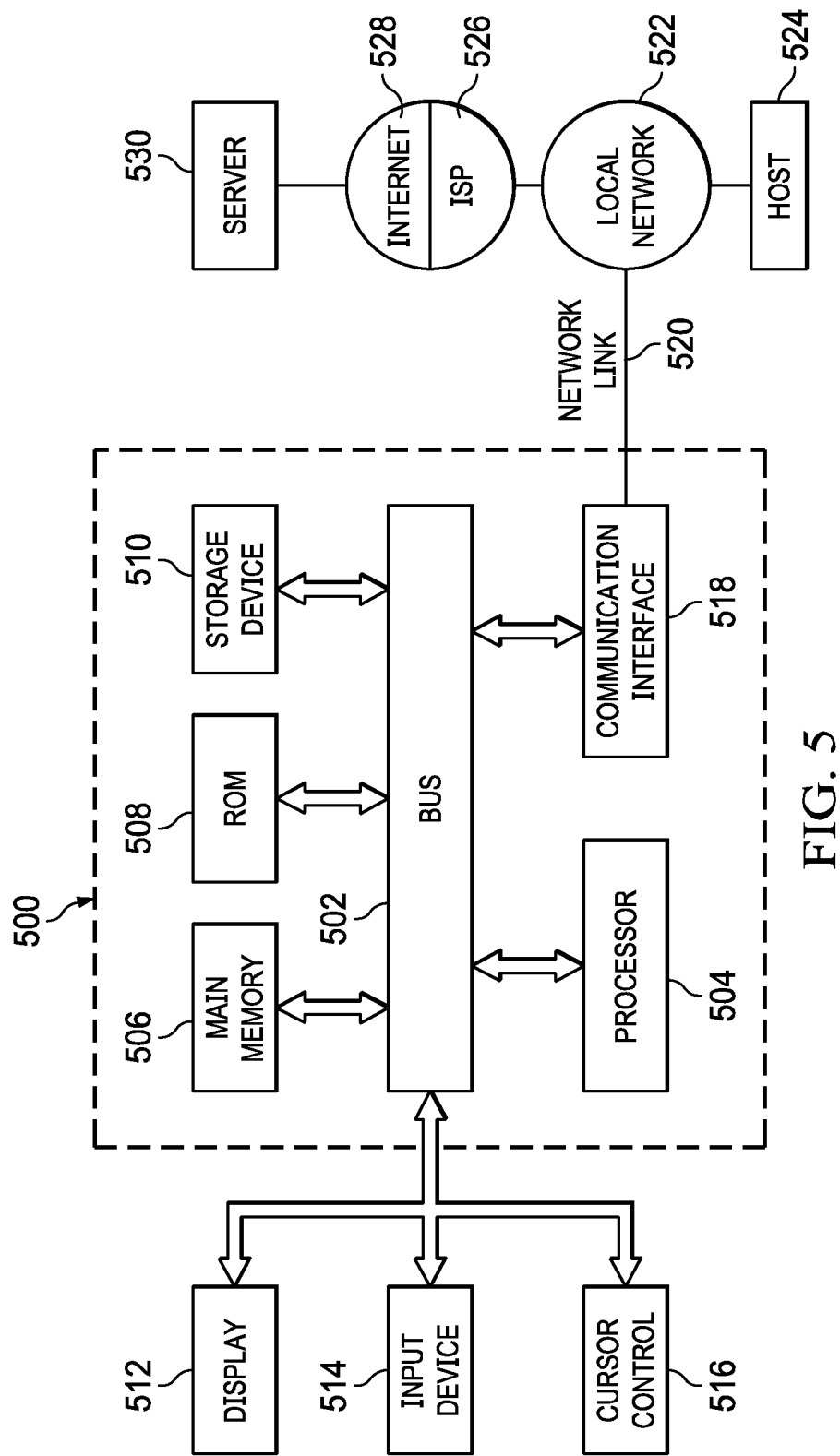
FIG. 5 illustrates an example hardware platform on which a computer or a computing device as described herein may be implemented.

For example, FIG. 5 is a block diagram that illustrates a computer system 500 upon which an example embodiment of the disclosure may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

7. Equivalents, Extensions, Alternatives And Miscellaneous

In the foregoing specification, example embodiments of the disclosure have been described with reference to numerous specific details that may vary from implementation to implementation. Thus, the sole and exclusive indicator of what is an embodiment of the disclosure, and is intended by the applicants to be an embodiment of the disclosure, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

EEE 1. A method for providing video stream data, comprising:
  accessing a non-random-access video stream encoded with image blocks to be processed with a non-random-access processing order, wherein a first image block of the image blocks is to be processed after one or more second image blocks in accordance with the non-random-access processing order;

receiving, from a recipient decoding device, view direction data of a viewer collected in real time while the viewer is viewing video content of a random-access video stream, wherein the random-access video stream is generated from the non-random-access video stream, wherein the view direction data indicates the viewer's view direction coinciding with a location covered by the first image block while the viewer is viewing the video content of the random-access video stream;

encoding the first image block into the random-access video stream before the one or more second image blocks in a random-access processing order different from the non-random-access processing order, wherein the random-access processing order is dependent of the viewer's view direction while video content of the random-access video stream is being rendered to the viewer; wherein the non-random-access processing order is independent of the viewer's view direction;

delivering the random-access video stream to the recipient decoding device operated by the viewer to cause the first image block to be processed and rendered from the random-access video stream before the one or more second image blocks in accordance with the random-access processing order.

EEE 2. The method of EEE 1, wherein the non-random-access processing order represents one of: a raster order, a zigzag order or a view-direction-independent processing order.

EEE 3. The method of EEE 1 or EEE 2, wherein the first image block belongs to a group of two or more image blocks that cover the viewer's viewport; wherein the one or more second image blocks are outside the viewer's viewport; wherein the group of two or more image blocks including the first image block is expedited for delivery to the recipient decoding device before the one or more second image blocks.

EEE 4. The method of any of EEEs 1-3, wherein the first image block belongs to a group of two or more image blocks that cover the viewer's region of interest; wherein the one or more second image blocks are outside the viewer's region of interest; wherein the group of two or more image blocks including the first image block is expedited for delivery to the recipient decoding device before the one or more second image blocks.

EEE 5. The method of any of EEEs 1-4, wherein the non-random-access video stream comprises a first image metadata portion that is to be delivered along with the first image block; wherein the first image metadata portion is used to transition a video codec from a previous coding state to a current coding state to decode the first image block; wherein the previous coding state is used by the video codec to decode a previous image block that is to decoded before the first image block according to the non-random-access processing order.

EEE 6. The method of Claim EEE 5, wherein the random-access video stream comprises a first modified image metadata portion that is delivered along with the first image block to the recipient decoding device; wherein the first modified image metadata portion is used to avoid going through the previous coding state according to the non-random-access processing order and to transition the recipient decoding device to the current coding state to decode the first image block; wherein the first modified image metadata portion differs from the first image metadata portion.

EEE 7. The method of EEE 6, wherein the first modified image metadata portion contains an update to a state for variable length coding operations; wherein the first image metadata portion does not contain the update.

EEE 8. The method of any of EEE 6 or EEE 7, wherein the first modified image metadata portion contains an update to a state for predictive coding operations; wherein the first image metadata portion does not contain the update.

EEE 9. The method of any of EEEs 1-8, wherein the random-access video stream is used to support one of: an augmented reality application, a virtual reality application, a cinema video application, a home-based video application, a video streaming application, a cloud-based video application, a Wi-Fi-based video application, a cellular-data-network-based video application, or an immersive video application.

10. A method for rendering video stream data, comprising:

receiving a random-access video stream from an upstream device, wherein the random-access video stream is generated from a non-random-access video stream;

sending, to the upstream device, view direction data of a viewer collected in real time while the viewer is viewing video content of the random-access video stream, wherein the view direction data indicates the viewer's view direction coinciding with a location covered by a first image block of image blocks while the viewer is viewing the video content of the random-access video stream;

wherein the non-random-access video stream is encoded with image blocks to be processed with a non-random-access processing order; wherein the first image block of the image blocks is to be processed after one or more second image blocks in accordance with the non-random-access processing order;

wherein the random-access processing order is dependent of the viewer's view direction while the video content of the random-access video stream is being rendered to the viewer; wherein the non-random-access processing order is independent of the viewer's view direction; receiving, from the upstream device, the first image block before the one or more second image blocks by way of the random-access video stream; processing and rendering the first image block before the one or more second image blocks in accordance with the random-access processing order.

EEE 11. The method of EEE 10, wherein the random-access video stream comprises base layer image data representing a relatively low quality version of the video content; wherein the base layer image data is used to derive motion estimation; wherein a relatively high quality version of the video content is generated based at least in part on the motion estimation as derived from the base layer image data and image data and image metadata as decoded from the random-access video stream.

EEE 12. The method of EEE 10 or EEE 11, wherein the first image block belongs to a group of two or more contiguous image blocks forming an image region that covers the viewer's direction; wherein the one or more second image block are outside the image region; wherein other images in the group of two or more contiguous image blocks are received, decoded and rendered before the one or more second image blocks.

EEE 13. The method of EEE 10 or EEE 11, wherein the random-access video stream is used to support one of: an augmented reality application, a virtual reality application, a cinema video application, a home-based video application, a video streaming application, a cloud-based video application, a Wi-Fi-based video application, a cellular-data-network-based video application, or an immersive video application.

EEE 14. An apparatus comprising a processor and configured to perform any one of the methods recited in EEEs 1-13.

EEE 15. A non-transitory computer-readable storage medium having stored thereon computer-executable instruction for executing a method with one or more processors in accordance with any of the methods recited in EEEs 1-13.

The invention claimed is:

1. A method for providing video stream data, comprising:
accessing a non-random-access video stream encoded with image blocks to be processed with a non-random-access processing order, wherein a first image block of the image blocks is to be processed after one or more second image blocks in accordance with the non-random-access processing order;
receiving, from a recipient decoding device, view direction data of a viewer collected in real time while the viewer is viewing video content of a random-access video stream, wherein the random-access video stream is generated from the non-random-access video stream, wherein the view direction data indicates the viewer's view direction coinciding with a location covered by the first image block while the viewer is viewing the video content of the random-access video stream;
encoding the first image block into the random-access video stream before the one or more second image blocks in a random-access processing order different from the non-random-access processing order, wherein the random-access processing order is dependent of the viewer's view direction while video content of the random-access video stream is being rendered to the viewer; wherein the non-random-access processing order is independent of the viewer's view direction;
delivering the random-access video stream to the recipient decoding device operated by the viewer to cause the first image block to be processed and rendered from the random-access video stream before the one or more second image blocks in accordance with the random-access processing order.

2. The method of claim 1, wherein the non-random-access processing order represents one of: a raster order, a zigzag order or a view-direction-independent processing order.

3. The method of claim 1, wherein the first image block belongs to a group of two or more image blocks that cover the viewer's viewport; wherein the one or more second image blocks are outside the viewer's viewport; wherein the group of two or more image blocks including the first image block is expedited for delivery to the recipient decoding device before the one or more second image blocks.

4. The method of claim 1, wherein the first image block belongs to a group of two or more image blocks that cover the viewer's region of interest; wherein the one or more second image blocks are outside the viewer's region of interest; wherein the group of two or more image blocks including the first image block is expedited for delivery to the recipient decoding device before the one or more second image blocks.

5. The method of claim 1, wherein the non-random-access video stream comprises a first image metadata portion that is to be delivered along with the first image block; wherein the first image metadata portion is used to transition a video codec from a previous coding state to a current coding state to decode the first image block; wherein the previous coding state is used by the video codec to decode a previous image block that is to be decoded before the first image block according to the non-random-access processing order.

6. The method of claim 1, wherein the random-access video stream comprises a first modified image metadata portion that is delivered along with the first image block to the recipient decoding device; wherein the first modified image metadata portion is used to avoid going through the previous coding state according to the non-random-access processing order and to transition the recipient decoding device to the current coding state to decode the first image block.

7. The method of claim 5, wherein the first modified image metadata portion differs from the first image metadata portion.

8. The method of claim 7, wherein the first modified image metadata portion contains an update to a state for variable length coding operations; wherein the first image metadata portion does not contain the update.

9. The method of claim 7, wherein the first modified image metadata portion contains an update to a state for predictive coding operations; wherein the first image metadata portion does not contain the update.

10. The method of claim 1, wherein the random-access video stream is used to support one of: an augmented reality application, a virtual reality application, a cinema video application, a home-based video application, a video streaming application, a cloud-based video application, a Wi-Fi-based video application, a cellular-data-network-based video application, or an immersive video application.

11. A method for rendering video stream data, comprising:
receiving a random-access video stream from an upstream device, wherein the random-access video stream is generated from a non-random-access video stream;
sending, to the upstream device, view direction data of a viewer collected in real time while the viewer is viewing video content of the random-access video stream, wherein the view direction data indicates the viewer's view direction coinciding with a location covered by a first image block of image blocks while the viewer is viewing the video content of the random-access video stream;
wherein the non-random-access video stream is encoded with image blocks to be processed with a non-random-access processing order; wherein the first image block of the image blocks is to be processed after one or more second image blocks in accordance with the non-random-access processing order;
wherein the random-access processing order is dependent of the viewer's view direction while the video content of the random-access video stream is being rendered to the viewer; wherein the non-random-access processing order is independent of the viewer's view direction;
receiving, from the upstream device, the first image block before the one or more second image blocks by way of the random-access video stream;

processing and rendering the first image block before the one or more second image blocks in accordance with the random-access processing order.

12. The method of claim 11, wherein the random-access video stream comprises base layer image data representing a relatively low quality version of the video content; wherein the base layer image data is used to derive motion estimation; wherein a relatively high quality version of the video content is generated based at least in part on the motion estimation as derived from the base layer image data.

13. The method of claim 11, wherein the first image block belongs to a group of two or more contiguous image blocks forming an image region that covers the viewer's direction; wherein the one or more second image block are outside the image region; wherein other images in the group of two or more contiguous image blocks are received, decoded and rendered before the one or more second image blocks.

14. The method of claim 11, wherein the random-access video stream is used to support one of: an augmented reality application, a virtual reality application, a cinema video application, a home-based video application, a video streaming application, a cloud-based video application, a Wi-Fi-based video application, a cellular-data-network-based video application, or an immersive video application.

15. The method of claim 11, wherein the non-random-access video stream comprises a first image metadata portion that is to be delivered along with the first image block; wherein the first image metadata portion is used to transition a video codec from a previous coding state to a current coding state to decode the first image block; wherein the previous coding state is used by the video codec to decode a previous image block that is to be decoded before the first image block according to the non-random-access processing order.

16. The method of claim 11, wherein the random-access video stream comprises a first modified image metadata portion that is delivered along with the first image block to a recipient decoding device; wherein the first modified image metadata portion is used to avoid going through the previous coding state according to the non-random-access processing order and to transition the recipient decoding device to the current coding state to decode the first image block.

17. The method of claim 15, wherein the first modified image metadata portion differs from the first image metadata portion.

18. The method of claim 17, wherein the first modified image metadata portion contains an update to a state for variable length coding operations; wherein the first image metadata portion does not contain the update.

19. An apparatus comprising a processor and configured to perform the method recited in claim 1.

20. A non-transitory computer-readable storage medium having stored thereon computer-executable instruction for executing a method with one or more processors in accordance with method recited in claim 1.

* * * * *